(12) United States Patent
Fakoorian et al.

(10) Patent No.: US 11,533,088 B2
(45) Date of Patent: Dec. 20, 2022

(54) CROSS-INTERFACE INTERFERENCE MANAGEMENT

(71) Applicant: QUALCOMM Incorporated, San Diego, CA (US)

(72) Inventors: Seyed Ali Akbar Fakoorian, San Diego, CA (US); Wei Yang, San Diego, CA (US); Seyedkianoush Hosseini, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/305,943

(22) Filed: Jul. 16, 2021

(65) Prior Publication Data

US 2022/0029670 A1 Jan. 27, 2022

Related U.S. Application Data

(60) Provisional application No. 63/058,468, filed on Jul. 29, 2020, provisional application No. 63/055,831, filed on Jul. 23, 2020.

(51) Int. Cl.
*H04B 7/02* (2018.01)
*H04B 7/0456* (2017.01)
(Continued)

(52) U.S. Cl.
CPC ......... *H04B 7/0456* (2013.01); *H04B 17/345* (2015.01); *H04W 16/14* (2013.01)

(58) Field of Classification Search
CPC .. H04B 7/0456; H04B 17/345; H04B 7/0413; H04B 7/0617; H04B 7/0639; H04W 16/14; H04L 25/0224; H04L 5/0051
(Continued)

(56) References Cited

U.S. PATENT DOCUMENTS

| | | | | |
|---|---|---|---|---|
| 2010/0317291 | A1* | 12/2010 | Richardson | ....... H04W 74/0825 455/63.1 |
| 2011/0286548 | A1* | 11/2011 | Robert Safavi | ....... H04L 5/0051 375/295 |

(Continued)

FOREIGN PATENT DOCUMENTS

CN 110972110 A 4/2020

OTHER PUBLICATIONS

International Search Report and Written Opinion—PCT/US2021/042240—ISA/EPO—dated Nov. 22, 2021.

(Continued)

*Primary Examiner* — Helene E Tayong
(74) *Attorney, Agent, or Firm* — ArentFox Schiff LLP

(57) ABSTRACT

One apparatus may be configured to transmit a set of reference signals on shared resources of a first communication link and a second communication link, the set of reference signals indicating an interference channel on the shared resources. The apparatus may further communicate data or control information on the first communication link following transmission of the set of reference signals. Another apparatus may be configured to detect a signal on shared resources of a first communication link and a second communication link, the signal being indicating an interference channel on the shared resources. The other apparatus may further perform channel estimation on the interference channel based on detecting the signal. The other apparatus may further communicate data or control information on the first communication link based on the channel estimation on the interference channel.

26 Claims, 10 Drawing Sheets

(51) Int. Cl.
*H04B 17/345* (2015.01)
*H04W 16/14* (2009.01)

(58) Field of Classification Search
USPC .................................................. 375/267
See application file for complete search history.

(56) References Cited

U.S. PATENT DOCUMENTS

| | | | | |
|---|---|---|---|---|
| 2013/0107746 | A1* | 5/2013 | Wang | H04L 5/0023 370/252 |
| 2018/0376308 | A1* | 12/2018 | Xiao | H04W 76/14 |
| 2019/0159135 | A1* | 5/2019 | MolavianJazi | H04W 52/10 |
| 2019/0174429 | A1* | 6/2019 | Wang | H04W 72/0473 |
| 2020/0053657 | A1* | 2/2020 | MolavianJazi | H04W 52/281 |
| 2021/0167916 | A1 | 6/2021 | Jiang et al. | |

OTHER PUBLICATIONS

Samsung: "Considerations on Sidelink CSI", 3GPP Draft, 3GPP TSG RAN WG1 Ad-Hoc Meeting 1901, R1-1901053, 3rd Generation Partnership Project (3GPP), Mobile Competence Centre, 650, Route Des Lucioles, F-06921 Sophia-Antipolis Cedex, France, vol. RAN WG1, Jan. 25, 2019 (Jan. 25, 2019), pp. 1-7, XP051576587, Retrieved from the Internet: URL: http://www.3gpp.org/ftp/tsg%5Fran/WG1%5FRL1/TSGR1%5FAH/NR%5FAH%5F1901/Docs/R1%2D1901053%2Ezip. [Retrieved on Jan. 25, 2019] Sections 2, 3, Paragraph Above Figure 2.

Samsung: "On Physical Layer Procedures for NR V2X", 3GPP Draft, R1-1901048, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 11, 2019 (Jan. 11, 2019), XP051576582, 11 Pages, Retrieved from the Internet:URL:http://www.3gpp.org/ftp/tsg%5Fran/WG1%5FRL1/TSGR1%5FAH/NR%5FAH%5F1901/Docs/R1%2D1901048%2Ezip [retrieved on Jan. 11, 2019] Paragraph [0004]-Paragraph [0005].

ZTE, et al., "Discussion on Measurements and RS Design for CLI Mitigation", 3GPP TSG RAN WG1 Meeting #88, 3GPP Draft, R1-1701615-8.1.6.2, Discussion on Measurement and RS Design for CCI, 3rd Generation Partnership Project (3GPP), Mobile Competence Centre; 650, Route Des Lucioles, F-06921 Sophia-Antipolis, vol. RAN WG1, No. Athens, Greece; Feb. 13, 2017-Feb. 17, 2017, Feb. 6, 2017, XP051220505, 13 Pages, Retrieved from the Internet: URL: http://www.3gpp.org/ftp/tsg_ran/WG1_RL1/TSGR1_88/Docs/ [retrieved on Feb. 6, 2017], the Whole Document.

* cited by examiner

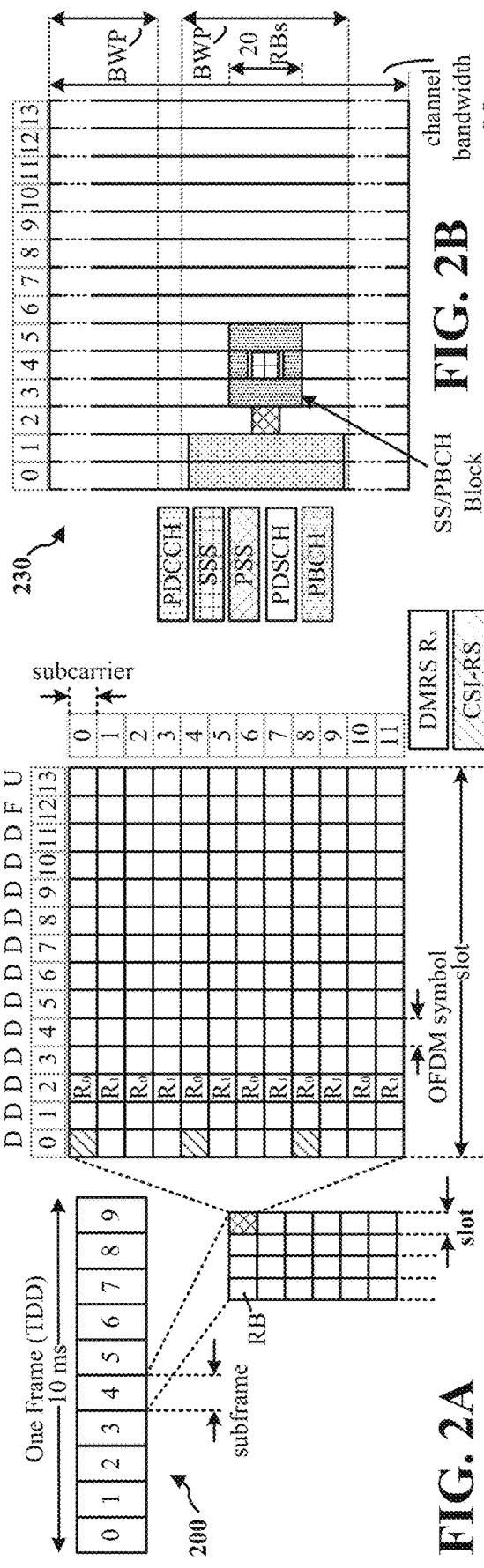
FIG. 2A
FIG. 2B
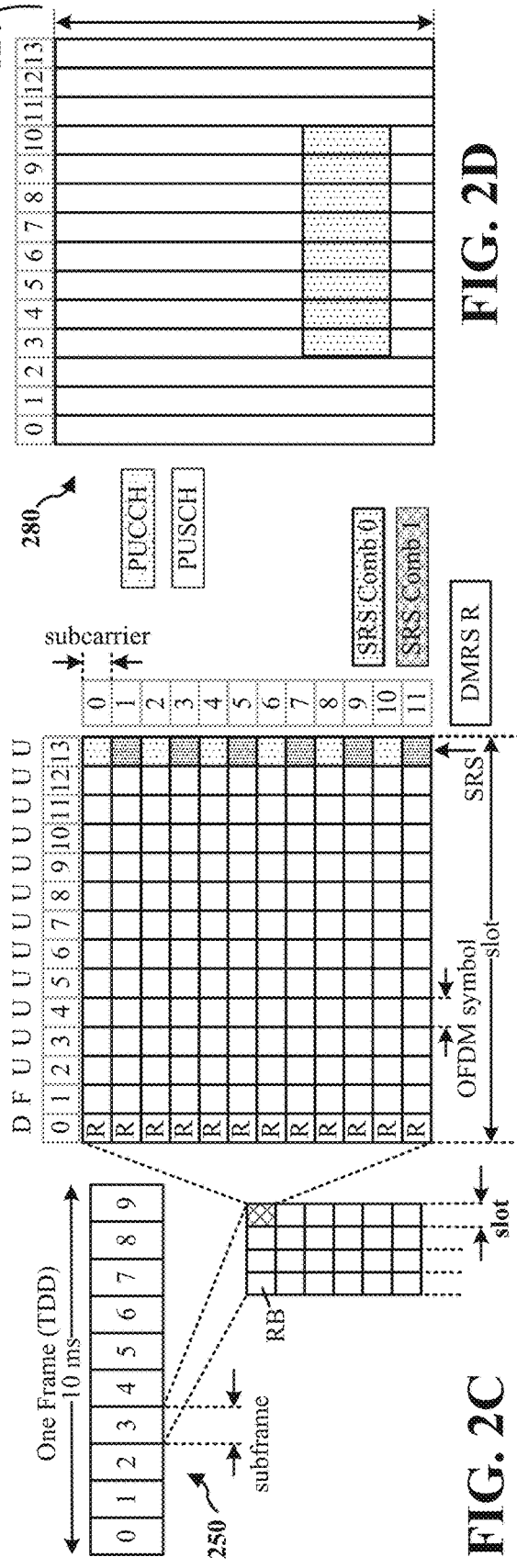
FIG. 2C
FIG. 2D

CROSS-INTERFACE INTERFERENCE MANAGEMENT

CROSS REFERENCE TO RELATED APPLICATION(S)

This application claims the benefit of U.S. Provisional Application Ser. No. 63/055,831, entitled "INTERFERENCE MANAGEMENT ON DIFFERENT INTERFACES BASED ON MULTIPLE-INPUT MULTIPLE-OUTPUT (MIMO) CONFIGURATIONS" and filed on Jul. 23, 2020, and U.S. Provisional Application Ser. No. 63/058,468, entitled "INTERFERENCE MANAGEMENT ON DIFFERENT INTERFACES BASED ON MULTIPLE-INPUT MULTIPLE-OUTPUT (MIMO) CONFIGURATIONS" and filed on Jul. 29, 2020, the disclosures of both of which are expressly incorporated by reference herein in their entirety.

BACKGROUND

Technical Field

The present disclosure generally relates to communication systems, and more particularly, to management of interference channels formed by independent transmitter and receiver pairs, which may be communicating on the same or different interfaces.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some environments, various wireless communications devices that are within range of one another may be engaged in different types of communication. For example, an environment of an example radio access network (RAN) may include devices configured to communicate using various technologies, including access network or network infrastructure technologies and direct device or sidelink technologies. An example technology may be associated with a communication and/or network interface. In order to communicate according to a specific technology, a device may implement the interface corresponding thereto.

For example, in 5G New Radio (NR), and other radio access technologies (RATs), a communication link between a base station and user equipment(s) (UE(s)) in the RAN may be on a RAN or network infrastructure interface, such as a Uu interface. However, UEs may be additionally or alternatively configured for direct device communication on a direct communication link or dedicated short-range communication (DRSC) link. In the context of 5G NR, such direct communication and/or DRSC links may avoid network infrastructure and/or may be connectionless, and therefore may take place on an interface that is different from the Uu interface, as a PC5 interface or sidelink interface.

Whether on the same or different interfaces, different communication links may share resources of the RAN, as the available system bandwidth may be constrained to a certain band or set of bands, and various timing structures may be well-defined and coordinated. For example, resources may be shared between two different UEs on two communication links on the same interface or different interfaces. As one example, resources may be shared between two UEs respectively configured on two direct communication links. In another example, resources may be shared between one UE configured on a direct communication link and another UE configured on a cellular communication link.

Due to this sharing of resources, communication links on the same and/or different interfaces can cause interference to one another. Accordingly, a need exists for improvements to management of interference channels resulting from different transmitter and receiver pairs that are proximate to one another in wireless environments.

The present disclosure describes techniques and solutions to mitigate interference when resources are shared between communication links on the same or different interfaces. For example, the present disclosure details multiple-input multiple-output (MIMO) techniques for interference nulling when the same resources are used for communication links on the same and/or different interfaces. Many of the techniques and solution described herein may be individually implemented and also combined to reduce interference on shared resources of communication links on the same and/or different interfaces.

In an aspect of the disclosure, a method, a computer-readable medium, and an apparatus are provided. The apparatus may be implemented at a UE, a base station, or a component thereof. The apparatus may be configured to transmit a set of reference signals on shared resources of a first communication link and a second communication link, the set of reference signals indicating an interference channel on the shared resources. The apparatus may be further configured to communicate data or control information on the first communication link following transmission of the set of reference signals.

In another aspect of the disclosure, another method, another computer-readable medium, and another apparatus are provided. The other apparatus may be implemented at a UE, a base station, or a component thereof. The other apparatus may be configured to detect a signal on shared resources of a first communication link and a second communication link, the signal being indicating an interference channel on the shared resources. The other apparatus may be further configured to perform channel estimation on the interference channel based on detecting the signal. The other apparatus may be further configured to communicate data or control information on the first communication link based on the channel estimation on the interference channel.

In a third aspect of the disclosure, a third method, a third computer-readable medium, and a third apparatus are provided. The third apparatus may be implemented at a base station or a component thereof. The third apparatus may be configured to configure a UE for communication of a set of reference signals based on an interference channel, the interference channel comprising shared resources of a first communication link and a second communication link. The third apparatus may be further configured to communicate data or control information on the first communication link following configuring the communication by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
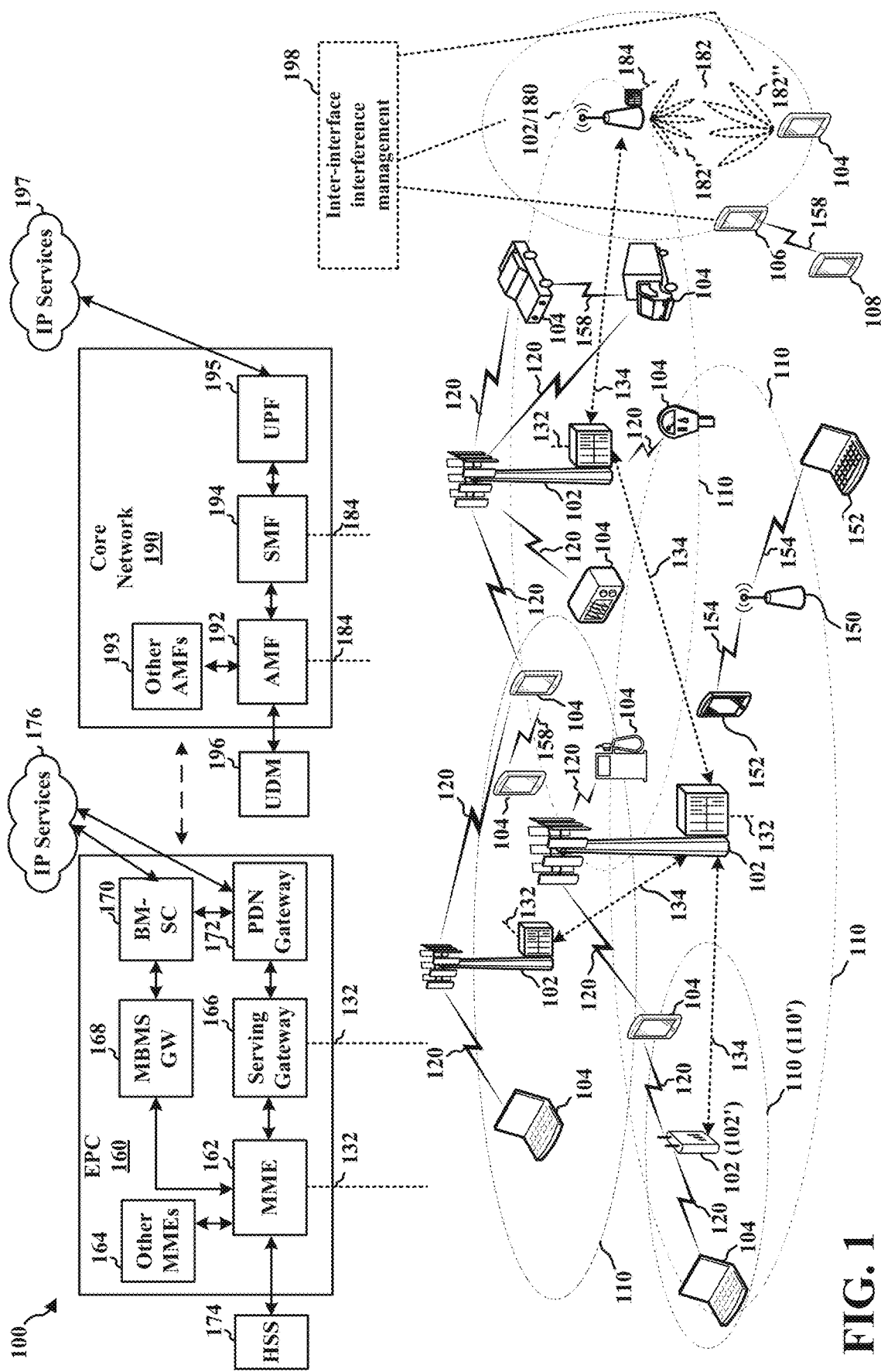
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, any person having ordinary skill in the art will recognize that these concepts and related aspects may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, a base station 102 operating as an IAB donor may provide a link to the one of the EPC 160 or the core network 190 for one or more of the UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless and other radio links may be on one or more carriers, or component carriers (CCs). The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, may be less than 7 GHz, may be within FR1, or may include mid-band frequencies. Further, unless specifically stated otherwise, the term "millimeter wave" and other similar references, to the extent used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signal between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signal between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, in certain aspects, the wireless communications system and access network 100 may include, inter alia, a base station 102/180, a first UE 104 communicating on a cellular communication link within the coverage area 110, a second UE 106 communicating on a sidelink or direct communication link within the coverage area 110, and a third UE 108 communicating on the sidelink or direct communication link outside the coverage area 110.

According to the system and access network 100, a cellular communication link may be on a Uu interface, whereas a sidelink or direct communication link may be on a PC5 interface. While the communication links and associated interfaces may share sets of resources, which may cause interference, at least one of the base station 102/180, the first UE 104, the second UE 106, and/or the third UE 108 may be configured for management (e.g., mitigation or avoidance) of spatial interference on an interference channel that is between a first communication link of a PC5 interface and a second communication link of a Uu interface (198).

In some aspects, at least one of the first UE 104, the second UE 106, or the base station 102/180 may be configured to determine at least one resource of an interference channel that interferes with a first communication link of a first interface. The interference channel may be associated with a second communication link of a second interface. The at least one of the first UE 104, the second UE 106, or the base station 102/180 may generate at least one first reference signal (RS) for channel estimation of the interference channel. The at least one of the first UE 104, the second UE 106, or the base station 102/180 may then transmit the at least one first reference signal on the at least one resource of the interference channel. Further, the at least one of the first UE 104, the second UE 106, or the base station 102/180 may communicate on the first communication link of the first interface. In such aspects, the at least one generated reference signal and the transmission thereof on the determined at least one resource may be used for management (e.g., mitigation or avoidance) of spatial interference on the interference channel that is between a first communication link of a PC5 interface and a second communication link of a Uu interface (198).

In some other aspects, at least one of the first UE 104 or the second UE 106 may be configured to detect an interference channel that is from the first communication link of the first interface to a second communication link of a second interface. The at least one of the first UE 104 or the second UE 106 may then communicate on the first communication link of the first interface based on detecting the interference channel. In such other aspects, the detection of the interference channel may be used for the management (e.g., mitigation or avoidance) of spatial interference on the interference channel that is between a first communication link of a PC5 interface and a second communication link of a Uu interface (198).

In still further aspects, the base station 102/180 may be configured to determine at least one resource of an interference channel that interferes with a first communication link of a first interface. The interference channel may be associated with a second communication link of a second interface. The base station 102/180 may then transmit, to at least one of the first UE 104 or the second UE 106, first configuration information indicating the at least one resource. The configuration information may enable transmission of at least one first reference signal on the at least one resource of the interference channel. Additionally, the base station 102/180 may communicate with the first UE 104 on the first communication link of the first interface. In such further aspects, the determined at least one resource of the interference channel and the transmission of configuration information indicating the same may be used for management (e.g., mitigation or avoidance) of spatial interference on the interference channel that is between a first communication link of a PC5 interface and a second communication link of a Uu interface (198).

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe.

The subcarrier spacing and symbol length/duration are a function of the numerology. The subcarrier spacing may be equal to $2^\mu*15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_X$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
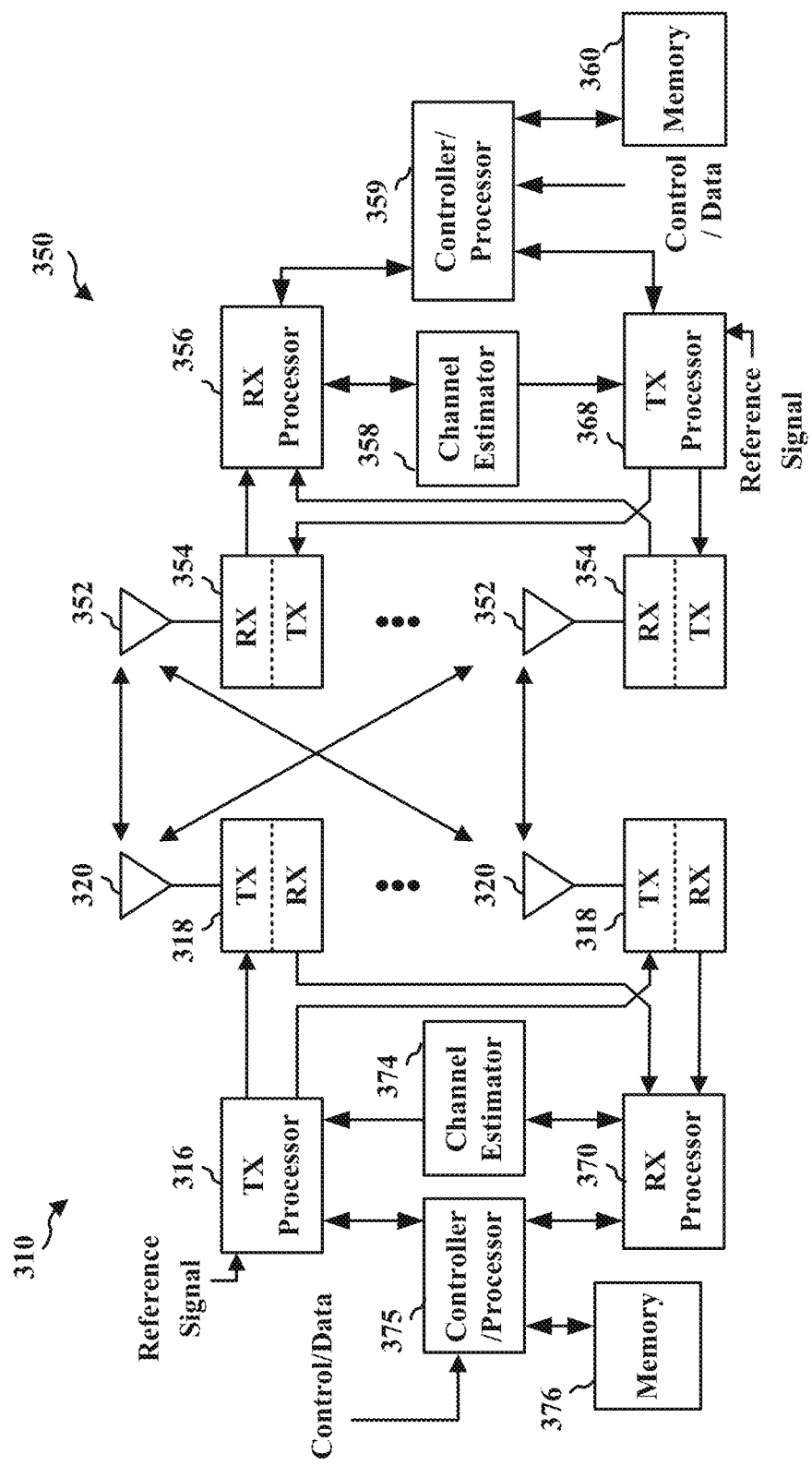
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with 198 of FIG. 1.

In some other aspects, at least one of the TX processor 316, the RX processor 370, and the controller/processor 375 may be configured to perform aspects in connection with the management (e.g., mitigation or avoidance) of spatial interference on an interference channel that is between a first communication link of a PC5 interface and a second communication link of a Uu interface (198) of FIG. 1.

In some wireless networks, various wireless communications devices may be configured for different types of communication even within the same network. For example, an example RAN may include devices configured to communicate using different technologies, such as conventional uplink/downlink communication, which may provide a connection to a core network, and D2D technology in which devices may directly communicate with one another, e.g., such that the communication path between devices avoids a core network and is generally not reliant upon a base station (although base stations may configure or coordinate some aspects of D2D communication).

Wireless communication may occur on a specific interface, which may implement one or more layers of a protocol stack. That is, a device may communicate according to a specific technology on an interface corresponding that specific technology, with the interface providing a mechanism for implementing the various layers of a protocol stack. Illustratively, a protocol stack for communicating in a RAN (e.g., 5G NR RAN) may include L1, L2, and L3 layers (e.g., described with respect to FIG. 3, supra).

In 5G NR and some other RATs, a communication link between a base station and UE(s) in the RAN may be on an air interface. The air interface may be realized through a Uu interface in the context of linking a UE to the RAN, such as a base station (e.g., an eNB, gNB, etc.) or other network infrastructure. The Uu interface may include L3 having an RRC layer, with resources and/or signaling radio bearer(s) being allocated through RRC connection establishment. The channels on the Uu interface include uplink, with the direction from UE to base station, and downlink, with the direction from base station to UE.

Two UEs in the RAN may also be configured with a direct communication link, which may be on a one-to-many interface and/or sidelink interface. Such direct device communication links may be implemented via a PC5 interface, which may include sidelink channel (and not uplink/downlink). The PC5 interface may be implemented through the air interface, though with some differences from the Uu interface (e.g., PC5 may be simplified relative to Uu). In particular, direct device communication links may be connectionless, and therefore, one or more layers of L2 and/or L3 (e.g., the RRC layer) may be excluded from the protocol stack.

Even on different interfaces, different communication links may have some or all radio resources of the RAN in common, which may include overlapping and/or adjacent resources (e.g., resources on which signaling is not specifically mapped, but onto which energy of the signal may leak). Therefore, resources may be common between systems and devices on communication links of the same or different types, potentially in the same cell or other geographically proximate area. In one example, resources may be common between UEs respectively configured via the PC5 interface on two direct communication links. In another example, resources may be common between UEs configured via the PC5 interface on a direct communication link and a base station and another UE configured via the Uu interface on a access network communication link or network infrastructure communication link.

Common resource usage between communication links may result in interference, as signaling on different links may overlap or leak into one another, thereby decreasing the signal-to-noise ratio (SNR) and the probability of successfully decoding the signal by the receiver. Those resources in common between a first transmitter-receiver link and a second transmitter-receiver link may result in an interference channel. In the context of RANs, a sidelink channel(s) on the PC5 interface having resources in common with an uplink and/or downlink channel(s) on the Uu interface may define an interference channel for an access network communication link on the Uu interface and/or a direct device communication link on the PC5 interface. Potentially, interference on an interference channel caused by sidelink communication on the PC5 interface may be unrestricted, e.g., to U symbols, which may appreciably degrade link quality of an access network communication link on the Uu interface (and/or another direct device communication link on the PC5 interface). Accordingly, a need exists for improvements to resource sharing between independent transmitter-receiver pairs with proximate communication links.

The present disclosure describes techniques and solutions to manage (e.g., mitigate or avoid) interference when resources are shared between independent transmitter-receiver pairs with proximate communication links, whether those communication links are on the same interface (e.g., PC5) or different interfaces (e.g., PC5 and Uu). For example, the present disclosure details MIMO techniques for interference management (e.g., mitigation, avoidance, nulling, etc.) when the same resources are used for independent communication links on the same and/or different interfaces. Many of the techniques and solution described herein may be individually implemented or combined to manage interference channels arising through resources commonly used on the same and/or different interfaces.

Figure 4:
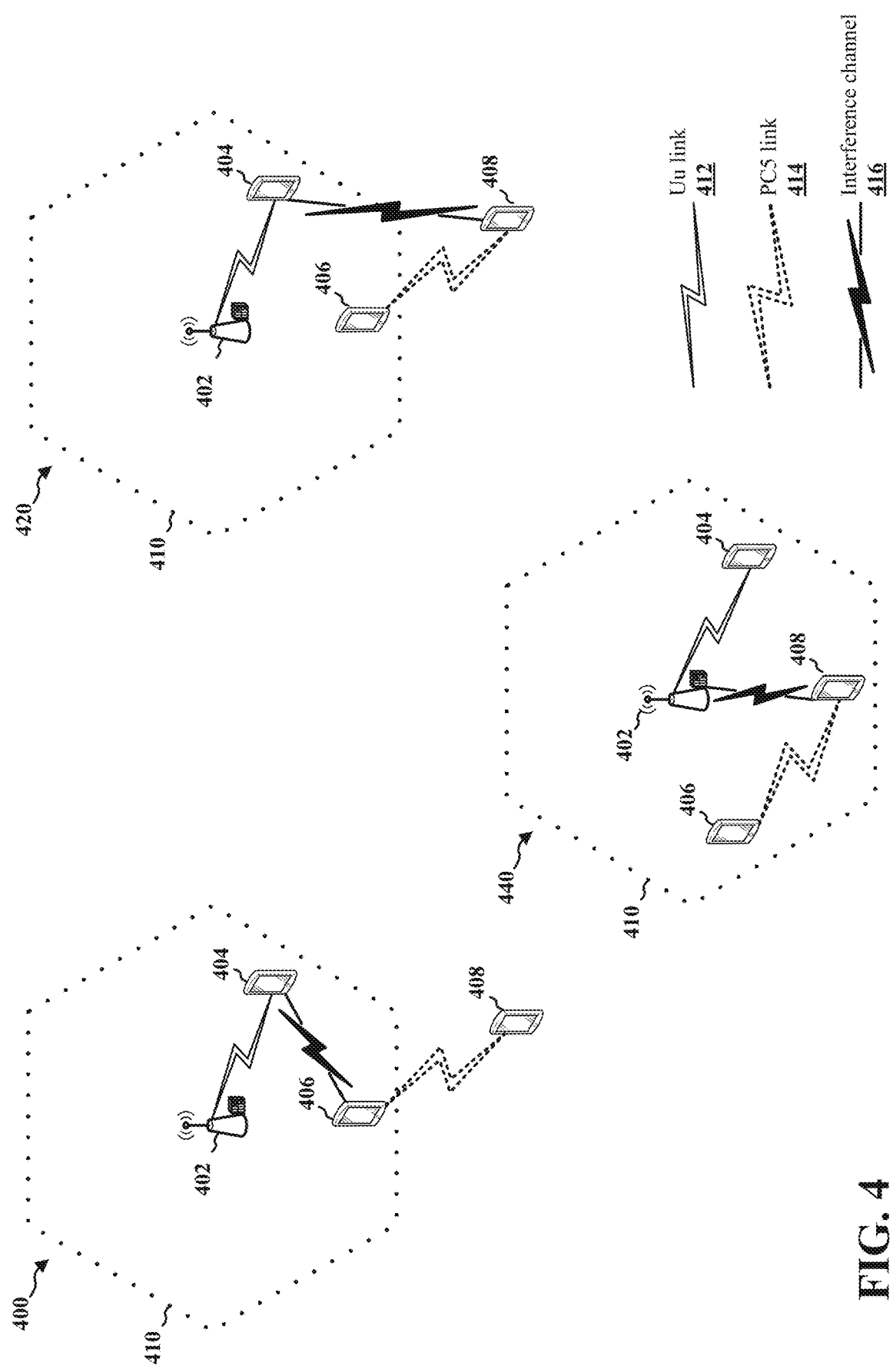
FIG. 4 is a diagram of example wireless communications environments.

FIG. 4 illustrates diagrams of example wireless communications environments 400, 420, 440 including a base station 402 and a plurality of UEs 404, 406, 408. In each of the example environments 400, 420, 440, at least one of the base station 402 and/or UEs 404, 406, 408 may be configured to implement various MIMO techniques for interference nulling when the same resources are used for Uu and/or PC5 communication links.

In the various example environments, the base station 402 may communicate with the first UE 404 on a Uu interface, with the radio link therebetween referred to as the Uu link 412. The first UE 404, therefore, may be referred to as a Uu UE, and further, may be referred to as an RX Uu UE when receiving downlink communication from the base station 402 on the Uu interface and/or TX Uu UE when transmitting uplink communication to the base station 402 on the Uu interface.

The second and third UEs 406, 408 may be configured to directly communicate with one another on the PC5 interface. Therefore, both the second and third UEs 406, 408 may be referred to as PC5 UEs, with the transmitting side being referred to as the TX PC5 UE and the receiving side being referred to as the RX PC5 UE. The PC5 UEs 406, 408 may communicate on a sidelink or direct communication link of the PC5 interface, which may be referred to as the PC5 link 414.

Referring to the first example environment 400, a potential scenario of UE-to-UE interference is illustrated. Specifically, the first PC5 UE 406 may transmit on the PC5 link 414 to the second PC5 UE 408, and in so doing, may cause interference to the Uu UE 404 configured to receive downlink communication from the base station 402 on the Uu link 412. Potentially, the first PC5 UE 406 may refrain or may be prohibited from transmitting on the PC5 link 414 when causing interference to the Uu UE 404. However, the potential for interference may not be known beforehand, or interference management that avoids back off to some degree by each transmitter-receiver pair may be desirable.

The interference caused by the first PC5 UE 406 may be on resources shared between the PC5 link 414 and the Uu link 412. Such shared resources may represented (and modeled) as an interference channel 416 between the PC5 link 414 and the Uu link 412. The interference channel 416 may be modeled for estimation and compensation of interference experienced on shared and/or adjacent resources of the Uu link 412 and the PC5 link 414.

In some aspects, the interference channel 416 may be managed so that the first PC5 UE 406 may be allowed to transmit in the null space, if any exists, of the interference channel 416, which may correspond to a spatial direction that limits interference to the Uu UE 404 on the Uu link 412. In effect, the null space of the interference channel 416 (or a matrix model thereof) may include areas or regions of space in which energy is absent or does not form, e.g., due to cancellation and/or destructive interference patterns of radio frequency (RF) waves. Potentially, the null space of the interference channel 416 may include shared resources on which the first PC5 UE 406 transmits signaling on the PC5 link 414 that is orthogonal on the interference channel 416 to other signaling on the Uu link 412. Thus, the null space may be functionally equivalent to orthogonality on the interference channel 416.

However, the first PC5 UE 406 may first detect the interference channel 416 in order to determine whether to transmit on the PC5 link 414 or refrain from (e.g., delay)

transmitting on the PC5 link 414. Thus, RSs may be transmitted such that the first PC5 UE 406 is able to receive those RSs in order to detect the interference channel 416. To enable detection of the interference channel 416 though, the RSs may be transmitted on at least one configured resource on the interference channel 416, which may be at least one resource on the PC5 link 414 and the Uu link 412.

In some aspects, the base station 402 may configure the at least one resource. For example, the base station 402 may determine at least one resource shared between the PC5 link 414 and the Uu link 412, and so on the interference channel 416. In some other aspects, the base station 402 may further configure at least one RS that is to be transmitted on the at least one resource. For example, the base station 402 may configure the at least one RS to include a specific sequence, which may be known and/or shared with the first PC5 UE 406. The base station 402 may configure the at least one RS to be at least one of an SRS, DM-RS, PT-RS, or CSI-RS.

The base station 402 may transmit, to the Uu UE 404, configuration information indicating the at least one resource and/or the at least one RS. Potentially, the base station 402 may also transmit such configuration information to the first PC5 UE 406 to configure the first PC5 UE 406 for receiving the at least one RS on the at least one resource. For example, the base station 402 may transmit such configuration information via RRC signaling and/or DCI.

The Uu UE 404 may transmit the at least one RS on the at least one resource (e.g., based on received configuration information) in order to indicate the interference channel 416—for example, the at least one RS may be used to perform channel estimation of the interference channel 416. The first PC5 UE 406 may receive the at least one RS on the at least one resource (e.g., based on the configuration information). Accordingly, the first PC5 UE 406 may detect the interference channel 416 based on the at least one RS on the at least one resource. For example, the first PC5 UE 406 may perform channel estimation for the interference channel 416 based on receiving the at least one RS on the at least one resource. The first PC5 UE 406 may calculate one or more beamforming parameters (e.g., magnitude, direction, weight(s), etc.) and/or may determine the precoder based on at least one RS received from the Uu UE 404.

According to various aspects, the Uu UE 404 may transmit the at least one RS on a precoded channel or on a non-precoded (or un-precoded) channel. According to various other aspects, the Uu UE 404 may transmit the at least one RS on a whitened channel or on a non-whitened channel. The base station 402 may configure the Uu UE 404 to transmit the at least one RS on the at least one resource of the precoded or non-precoded channel and/or of the whitened or non-whitened channel.

In some aspects, the base station 402 may use a spatial relationship information parameter (e.g., a spatialRelationInfo parameter) to indicate configuration information that configures the at least one RS on the at least one resource that corresponds to an identifier (ID) of another reference RS, such as an SSB or CSI-RS transmitted by the base station 402 or a reference SRS. Accordingly, the Uu UE 404 may transmit the at least one RS on the at least one resource with the same or similar spatial domain filter used for reception of the reference SSB or CSI-RS or transmission of the reference SRS. In some other aspects, the base station 402 may transmit, to the Uu UE 404, DCI to indicate a transmission configuration indication (TCI) state with a quasi-colocation (QCL) Type of Type-D. Accordingly, the Uu UE 404 may transmit the at least one RS on the at least one resource using the same spatial filter for reception (e.g., of a reference SSB or CSI-RS) indicated by the TCI state.

In some aspects, the first PC5 UE 406 may detect (and receive) the at least one RS on the at least one resource from the Uu UE 404. The first PC5 UE 406 may detect the interference channel 416 based on the at least one RS, and may configure transmission based on the interference channel 416. Modeling the effective channel (e.g., the Uu link 412) with the interference channel 416 may be used for interference management with the aim of reducing or avoiding interference from another UE, such as the TX PC5 UE 406.

Illustratively, an interfering signal from the first PC5 UE 406 may be modeled as Y, given in Equation 1:

$$Y = H_{gNB\text{-}Uu} W_d S_d + H_{SL\text{-}Uu} W_I S_I + Z, \text{ with } R_{nn} = \mathrm{cov}(Z) \quad \text{Equation 1}$$

In Equation 1, H is a channel, which may be represented by a channel model in some instances, such as a channel vector, channel matrix, or other sample-based representation of a channel. Thus, $H_{gNB\text{-}Uu}$ may represent the channel between the base station 402 and Uu UE 404 (e.g., the Uu link 412), potentially modeling an ideal channel. $H_{SL\text{-}uu}$ may represent the channel between the first PC5 UE 406 and the Uu UE 404 (e.g., the interference channel 416). Further, W is the precoder, and so $W_d$ is the desired precoder from the base station 402 to the Uu UE 404, while $W_I$ is precoder of the first PC5 UE 406 associated with potential interfering signals to Uu UE 404 on the interfering channel 416. Next, S represents the signal (e.g., one or more symbols), with $S_d$ being the desired signal transmitted by the base station 402 (e.g., ideal signal with no interference). $S_I$ represents the signal (e.g., symbols) transmitted by first PC5 UE 406—that is, $S_I$ may be the signal on the interference channel 416 that potentially causes interference to the Uu UE 404. Z may model other interference plus noise from other sources; and $R_{nn} = \mathrm{cov}(Z)$ is the covariance matrix of Z.

When the Uu UE 404 transmits the at least one RS on the at least one resource without precoding then, if any null space on the interference channel 416 exists, the first PC5 UE 406 may be configured to transmit a signal on a precoded channel $W_I$ that is in the null space of $H_{SL\text{-}Uu}$. The first PC5 UE 406 may receive the non-precoded at least one RS on the at least one resource, and may estimate the non-precoded interference channel 416 between the first PC5 UE 406 and the Uu UE 404. If the first PC5 UE 406 finds null space on the interference channel 416, then the first PC5 UE 406 may transmit a sidelink transmission to the second PC5 UE 408 on the PC5 link 414 on the precoded channel $W_1$ that is in the null space of $H_{SL\text{-}Uu}$.

Illustratively, if the first PC5 UE 406 finds $W_I S_I$ is orthogonal to $H_{SL\text{-}Uu}$, then the first PC5 UE 406 may transmit a sidelink transmission to the second PC5 UE 408 on the PC5 link 414. In other words, if the first PC5 UE 406 determines $H_{SL\text{-}Uu} W_I S_I = 0$, or approximately 0, then the first PC5 UE 406 may transmit a sidelink transmission to the second PC5 UE 408 on the PC5 link 414. In at least one configuration, however, the first PC5 UE 406 may be unable to find null space on the interference channel 416 when the interference channel 416 is 2×2. When the first PC5 UE 406 is unable to find the null space on the interference channel 416, the first PC5 UE 406 may refrain from transmitting a sidelink transmission to the second PC5 UE 408 on the PC5 link 414. That is the PC5 UE 406 may back off or defer transmission to the Uu link 412.

When the Uu UE 404 transmits the at least one RS on the at least one resource with whitening, the first PC5 UE 406 may be configured to transmit a signal on a precoded channel $W_I$ that is in the null space of the effective channel, which may be the whitened interference channel 416 modeled as $R_{nn}^{-1/2}H_{SL-Uu}$. Here, the probability of the first PC5 UE 406 to find null space on the effective channel $R_{nn}^{-1/2}H_{SL-Uu}$ may be increased relative to the non-precoded channel. Thus, when the at least one RS is transmitted by the Uu UE 404 on the whitened channel, the first PC5 UE 406 may transmit a sidelink transmission to the second PC5 UE 408 on the PC5 link 414 in the null space of $R_{nn}^{-1/2}H_{SL-Uu}$.

In another aspect, when the Uu UE 404 transmits the at least one RS on the at least one resource with precoding, the null space of the interference channel 416 on which the first PC5 UE 406 may transmit on the PC5 link 414 may be given by the effective channel in the null space of a precoded channel modeled as $W_d^H H_{gNB-Uu}^H R_{nn}^{-1} H_{SL-Uu}$. That is, the first PC5 UE 406 may transmit on the PC5 link 414 when the channel precoder $W_I$ is configured in the null space of $W_d^H H_{gNB-Uu}^H R_{nn}^{-1} H_{SL-Uu}$. In other words, the first PC5 UE 406 may determine channel estimation based on the at least one precoded RS received on the precoded effective channel, and the first PC5 UE 406 may transmit a sidelink transmission to the second PC5 UE 408 on the PC5 link 414 when the sidelink transmission is orthogonal to the effective channel between the base station 402 and the Uu UE 404 given by $W_I$ is in the null space of $W_d^H H_{gNB-Uu}^H R_{nn}^{-1} H_{SL-Uu}$. Here, the first PC5 UE 406 has the greatest opportunity to find null space on the effective channel relative to the at least one RS being transmitted without precoding or with whitening. However, this increase in opportunity proportionally increases the cost of complexity, as precoding is also relatively more complex than non-precoding and whitening.

In some other aspects, the Uu UE 404 may incorporate spatial interference on the interference channel 416 from the first PC5 UE 406 when calculating at least one PMI and reporting the at least one PMI to the base station 402. For example, the Uu UE 404 may incorporate the spatial interference on the interference channel 416 when calculating the at least one PMI based on configuration information received from the base station 402. In some aspects, the base station 402 may configure the Uu UE 404 to transmit at least two separate PMIs: at least one first PMI with the spatial interference on the interference channel 416 and at least one second PMI without the spatial interference on the interference channel 416.

To that end, the base station 402 may transmit at least one second RS (e.g., SSB, CSI-RS, DM-RS, another RS), and the Uu UE 404 may receive the at least one second RS. The Uu UE 404 may determine at least one first PMI based on receiving the at least one second RS and based on spatial interference on the interference channel, and the at least one first PMI may be associated with downlink communication on the Uu link 412 with the spatial interference on the interference channel 416.

Further, the base station 402 may transmit the at least one third RS (e.g., SSB, CSI-RS, DM-RS, another RS), and the Uu UE 404 may receive the at least one third RS. The Uu UE 404 may determine at least one second PMI based on receiving the at least one third RS but without the spatial interference on the interference channel 416. In other words, the at least one second PMI may be associated with downlink communication on the Uu link 412 without spatial interference on the interference channel 416.

The Uu UE 404 may then transmit the at least one first PMI and/or the at least one second PMI to the base station 402. Potentially, the at least one first PMI and/or at least one second PMI may correspond to the highest mitigation of the spatial interference on the interference channel 416. In some aspects, the Uu UE 404 may transmit the at least one first PMI and/or at least one second PMI based on configuration information received from the base station 402, which may configure the Uu UE 404 for reporting PMIs both with and without the spatial interference on the interference channel 416.

The base station 402 may receive the at least one first PMI and/or at least one second PMI from the RX Uu UE 404 on the Uu link 412, e.g., based on transmitted configuration information. Subsequently, the base station 402 may configure communication with the RX Uu UE 404 on the Uu link 412 based on the at least one first PMI and/or at least one second PMI. For example, the base station 402 may apply the at least one first PMI and/or at least one second PMI for precoding of a downlink transmission to the RX Uu UE 404 on the Uu link 412, which may be received by the RX Uu UE 404.

As the first PMI may be based on spatial interference on the interference channel 416 (e.g., spatial interference caused by TX PC5 UE 406), the base station 402 may use the first PMI for transmission of a downlink transmission to the RX Uu UE 404 on the Uu link 412 when the TX PC5 UE 406 is also transmitting a sidelink transmission on the PC5 link 414. For example, the base station 402 may configure a precoder for the downlink transmission to the RX Uu UE 404 on the Uu link 412 based on the first PMI when the base station 402 detects spatial interference on the interference channel 416 (e.g., when spatial interference satisfies a threshold).

In some aspects, the base station 402 may use the first PMI when scheduling an overlapping (e.g., simultaneous) sidelink transmission by the TX PC5 UE 406. That is, when the base station 402 controls scheduling of sidelink transmission by the TX PC5 UE 406, the base station 402 may use the first PMI (based on spatial interference on the interference channel 416) to schedule a sidelink transmission by the TX PC5 UE 406 that is on the same set of resources as a downlink transmission scheduled for transmission by the base station 402 to the RX Uu UE 404, such as when the Uu link 412 and the PC5 link 414 share a set of resources. For example, for a Mode 1 resource allocation (e.g., resources on the PC5 link 414 are allocated by the base station 402), the base station 402 may know in advance whether sidelink transmissions on the PC5 link 414 are concurrently scheduled with transmissions on the Uu link 412. When the base station 402 has such advance knowledge (e.g., per Mode 1), the base station 402 may refrain from detecting interference on the interference channel 416 (e.g., to determine whether the sidelink transmission on the PC5 link 414 is concurrent with the transmission on the Uu link 412), but may still use the first PMI (based on the spatial interference on the interference channel 416) for downlink transmission to the RX Uu UE 404 on the Uu link 412.

Similarly, the base station 402 may use the second PMI, which is based on an absence of spatial interference on the interference channel 416, for transmission of a downlink transmission to the RX Uu UE 404 on the Uu link 414 when the TX PC5 UE 406 is not transmitting a sidelink transmission on the PC5 link 414 (or when the TX PC5 UE 406 is transmitting a sidelink transmission with a transmission power that is sufficiently low enough not to interfere with the downlink transmission from the base station 402 on the Uu link 412). For example, the base station 402 may configure a precoder for the downlink transmission to the RX Uu UE 404 on the Uu link 412 based on the second PMI when the base station 402 detects no or sufficiently low spatial interference on the interference channel 416 (e.g., when spatial interference fails to satisfy a threshold).

In some aspects, the base station 402 may use the second PMI when scheduling a non-overlapping (e.g., non-concurrent) sidelink transmission by the TX PC5 UE 406. That is, when the base station 402 controls scheduling of sidelink transmission by the TX PC5 UE 406, the base station 402 may use the second PMI (based on no spatial interference on the interference channel 416) to schedule a sidelink transmission by the TX PC5 UE 406 that is on a different set of resources than a downlink transmission scheduled for transmission by the base station 402 to the RX Uu UE 404. For example, for a Mode 1 resource allocation (e.g., resources on the PC5 link 414 are allocated by the base station 402), the base station 402 may know in advance that sidelink transmissions on the PC5 link 414 are not concurrently scheduled with transmissions on the Uu link 412. When the base station 402 has such advance knowledge (e.g., per Mode 1), the base station 402 may refrain from detecting interference on the interference channel 416 (e.g., to determine whether the sidelink transmission on the PC5 link 414 is not concurrent with the transmission on the Uu link 412), but may still use the second PMI (based on the absence of spatial interference on the interference channel 416) for downlink transmission to the RX Uu UE 404 on the Uu link 412 because the base station 402 knows in advance that there is no sidelink transmission concurrently scheduled with the downlink transmission using the second PMI.

Referring to the second example environment 420, another potential scenario of UE-to-UE interference is illustrated. Specifically, the TX Uu UE 404 may transmit on the Uu link 412 to the base station 402, and in so doing, may cause interference to the RX PC5 UE 408 configured to receive sidelink communication from the TX PC5 UE 406 on the PC5 link 414. Aspects described with respect to the example environments 400, 420 may also be applied to a TX PC5 UE that causes interference to a different RX PC5 UE on a different PC5 link.

In some aspects, the interference caused by the TX Uu UE 404 may be on resources shared between the PC5 link 414 and the Uu link 412. Such shared resources may be included on an interference channel 416 between the PC5 link 414 and the Uu link 412.

The TX Uu UE 404 may be allowed to transmit in the null space between the PC5 link 414 and the Uu link 412, if any null space exists. In effect, the null space of the interference channel 416 may include areas or regions of space in which energy is absent or does not form, e.g., due to cancellation and/or destructive interference patterns of RF waves. Potentially, the null space of the interference channel 416 may include shared resources on which the TX Uu UE 404 transmits signaling on the Uu link 412 that is orthogonal on the interference channel 416 to other signaling on the PC5 link 414. Thus, the null space may be functionally equivalent to orthogonality on the interference channel 416.

However, the TX Uu UE 404 may first detect the interference channel 416 in order to determine whether to transmit on the Uu link 412 or refrain from (e.g., delay) transmitting on the Uu link 412. Thus, RSs may be transmitted that the TX Uu UE 404 is able to receive in order to detect the interference channel 416. To enable detection of the interference channel 416 though, the RSs may be transmitted on at least one configured resource on the interference channel 416, which may be at least one resource on the Uu link 412 and the PC5 link 414.

In some aspects, the base station 402 may configure the at least one resource (e.g., if the RX PC5 UE 408 is in the coverage area 110). In some other aspects, another UE (e.g., the TX PC5 UE 406) may configure the at least one resource. For example, the base station 402 or TX PC5 UE 406 may determine at least one resource shared between the Uu link 412 and the PC5 link 414, and so on the interference channel 416.

In some aspects, the base station 402 may further configure at least one RS that is to be transmitted on the at least one resource (e.g., if the RX PC5 UE 408 is in the coverage area 110). In some other aspects, another UE (e.g., the TX PC5 UE 406) may configure the at least one RS. For example, the base station 402 or TX PC5 UE 406 may configure the at least one RS to include a specific sequence, which may be known and/or shared with the TX Uu UE 404. The base station 402 or TX PC5 UE 406 may configure the at least one RS to be at least one of an SRS, DM-RS, PT-RS, or CSI-RS.

The base station 402 or TX PC5 UE 406 may transmit, to the RX PC5 UE 408, configuration information indicating the at least one resource and/or the at least one RS. Potentially, the base station 402 may also transmit such configuration information to the TX Uu UE 404 to configure the TX Uu UE 404 for receiving the at least one RS on the at least one resource. For example, the base station 402 may transmit such configuration information via RRC signaling and/or DCI, or TX PC5 UE 406 may transmit such configuration information as sidelink control information (SCI).

The RX PC5 UE 408 may transmit the at least one RS on the at least one resource (e.g., based on received configuration information) in order to indicate the interference channel—for example, the at least one RS may be used to perform channel estimation of the interference channel 416. The TX Uu UE 404 may receive the at least one RS on the at least one resource (e.g., based on the configuration information). Accordingly, the TX Uu UE 404 may detect the interference channel 416 based on the at least one RS on the at least one resource. For example, the TX Uu UE 404 may perform channel estimation for the interference channel 416 based on receiving the at least one RS on the at least one resource.

In some aspects, the RX PC5 UE 408 may transmit the at least one RS with precoding, with whitening, or without precoding. The base station 402 or the TX PC5 UE 406 may configure the RX PC5 UE 408 to transmit the at least one RS on the at least one resource with precoding, with whitening, or without precoding. For example, the RX PC5 UE 408 may be configured for transmission of the at least one RS on the at least one resource, as described supra with respect to the RX Uu UE 404.

In some other aspects, spatial interference on the interference channel 416 from the TX Uu UE 404 may be considered when calculating precoding information, e.g., at the base station 402. For example, the TX Uu UE 404 may incorporate the spatial interference on the interference channel 416 when transmitting at least one second RS to enable calculation of precoding information by the base station 402. In some aspects, the base station 402 may configure the TX Uu UE 404 to transmit at least two separate RSs: at least one second RS with the spatial interference on the interference channel 416 and at least one third RS without the spatial interference on the interference channel 416.

Thus, the base station 402 may receive the at least one second RS (e.g., SRS, CSI-RS, DM-RS, another RS) from the TX Uu UE 404 with the spatial interference on the interference channel 416 to the RX PC5 UE 408—e.g., the at least one second RS may be transmitted when spatial interference is present on the interference channel 416, e.g., when the first PC5 UE 406 concurrently transmitting. The base station 402 may determine first precoding matrix information based on receiving the at least one second RS with the spatial interference on the interference channel 416, and the first precoding matrix information may be associated with uplink communication on the Uu link 412 with the spatial interference on the interference channel 416. For example, the base station 402 may determine a first PMI that is based on spatial interference on the interference channel 416—that is, the first PMI may take into account an overlapping sidelink transmission from the TX PC5 UE 406 on the PC5 link 414.

Further, the TX Uu UE 404 may transmit the at least one third RS (e.g., SRS, CSI-RS, DM-RS, another RS), and the base station 402 may receive the at least one third RS. The at least one third RS may be transmitted without spatial interference on the interference channel 416—e.g., the TX Uu UE 404 may transmit the at least one third RS when the TX PC5 UE 406 is not transmitting a sidelink transmission on the PC5 link 414. The base station 402 may determine second precoding information based on receiving the at least one third RS but without the spatial interference on the interference channel 416. In other words, the second precoding matrix information may be associated with uplink communication on the Uu link 412, absent spatial interference on the interference channel 416 caused by the TX PC5 UE 406. For example, the base station 402 may determine a second PMI that is based on an absence (or sufficiently low) spatial interference on the interference channel 416—that is, the second PMI may be based on an absence of (or sufficiently low) overlapping sidelink transmission from the TX PC5 UE 406 on the PC5 link 414.

In some aspects, the base station 402 may determine one of the first or second precoding matrix information associated with communication with the TX Uu UE 404. For example, the base station 402 may receive uplink communication on the Uu link 412 based on the first and/or second precoding information.

In some other aspects, the base station 402 may transmit the first PMI and/or the second PMI to the TX Uu UE 404. The TX Uu UE 404 may receive the first PMI and/or the second PMI from the base station 402 for precoding the uplink channel. The TX Uu UE 404 may apply the first PMI or the second PMI when transmitting an uplink transmission to the base station 402 on the Uu link 412 based on spatial interference on the interference channel 416.

For example, the TX Uu UE 404 may apply the first PMI for an uplink transmission to the base station 402 on the Uu link 412 when spatial interference on the interference channel 416 satisfies a threshold (e.g., when the TX PC5 UE 406 is concurrently transmitting on the PC5 link 414). Thus, the base station 402 may receive the uplink transmission based on the first PMI when the spatial interference occurs on the interference channel 416, as the TX Uu UE 404 transmits the uplink transmission on the Uu link 412 along a precoded channel that accounts for the spatial interference from the TX PC5 UE 406.

Similarly, the TX Uu UE 404 may apply the second PMI for transmission of an uplink transmission to the base station 402 on the Uu link 412 when the TX PC5 UE 406 is not transmitting a sidelink transmission on the PC5 link 414 (or is transmitting with a transmission power that is sufficiently low that no or a negligible amount of spatial interference is received on the interference channel 416). Thus, the base station 402 may receive the uplink transmission based on the second PMI when spatial interference is absent from (or is negligible on) the interference channel 416, as the TX Uu UE 404 transmits the uplink transmission on the Uu link 412 along a precoded channel without spatial interference from the TX PC5 UE 406.

Referring to the example environment 440, a base station-to-UE interference scenario is illustrated. Here, the RX PC5 UE 408 may transmit at least one RS on at least one resource of the interference channel 416, as described supra. Potentially, the Uu UE 404 may report at least one first PMI and/or at least one second PMI, as described supra. Alternatively or additionally, the Uu UE 404 may transmit at least one second RS and/or at least one third RS, as described supra.

Figure 5:
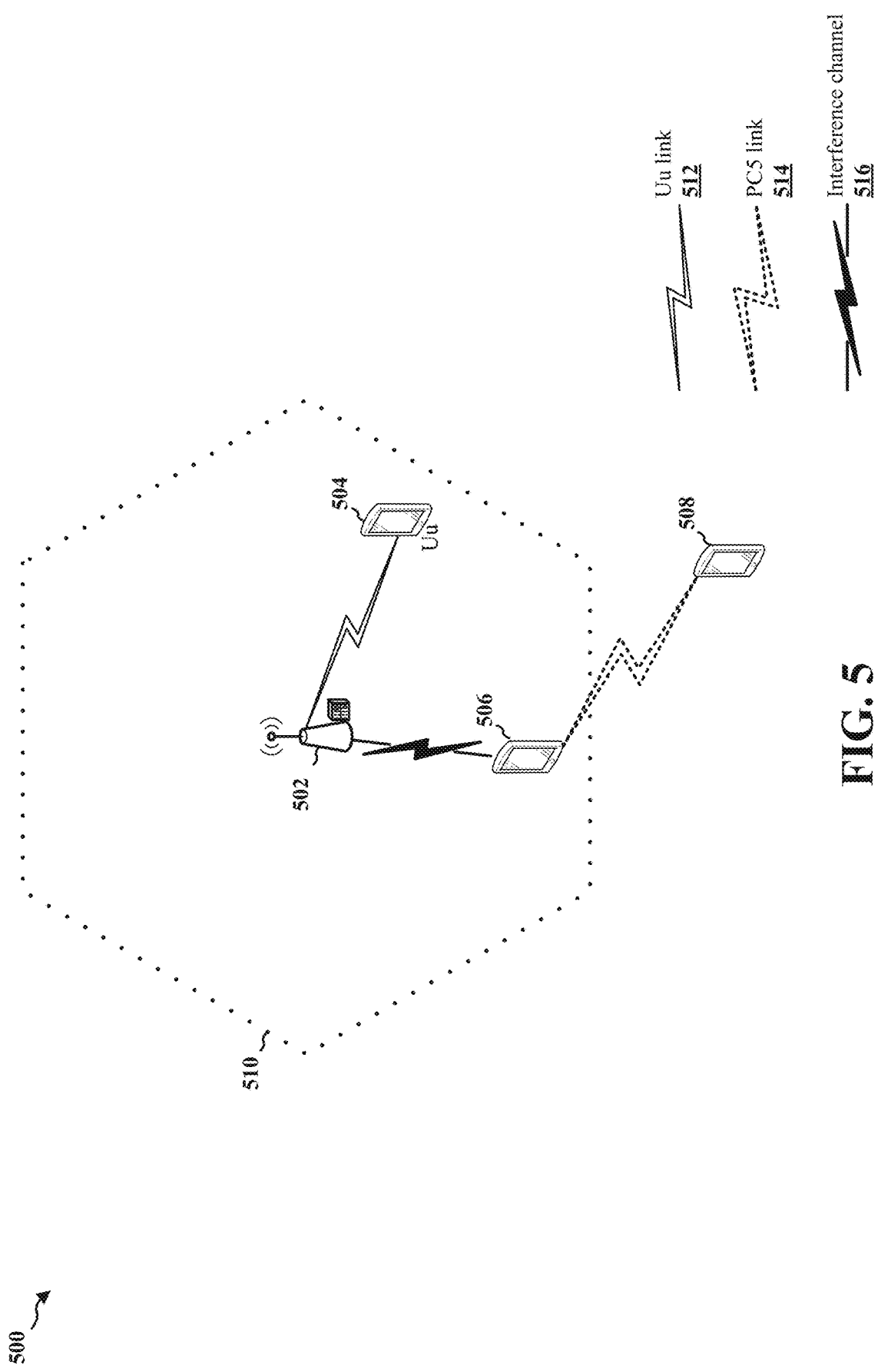
FIG. 5 is a diagram of another example wireless communications environment.

FIG. 5 illustrates a block diagram of an example wireless communication environment 500 including a base station 502 and a plurality of UEs 504, 506, 508. The example environment 500, a potential scenario of UE-to-base station interference is illustrated. Specifically, the TX PC5 UE 506 may transmit on the PC5 link 514 to the RX PC5 UE 508, and in so doing, may cause interference within the coverage area 510 to the base station 502 configured to receive uplink communication from the RX Uu UE 504 on the Uu link 512.

In some aspects, the interference caused by the TX PC5 UE 506 may be on resources shared between the PC5 link 514 and the Uu link 512. Such shared resources may be modeled as an interference channel 516 that includes shared resources of the PC5 link 514 and the Uu link 512. According to some technologies (e.g., V2X), the interference on the interference channel 516 may be mitigated by configuring the TX PC5 UE 506 with a specific set of open-loop power control parameters, which may be different from other open-loop power control parameters and may be selected based upon the interference caused to the base station 502 on the Uu link 512. For example, the minimum is taken of the power value(s) given by: (1) open-loop power control based on downlink path loss; and (2) the open-loop power control based on sidelink path loss. By configuring the TX PC5 UE 506 to transmit with the minimum power value(s), interference on the interference channel 516 may be reduced.

In another aspect, the base station 502 may configure the TX PC5 UE 506 with a transmission scheme and/or precoder, e.g., by transmitting configuration information to the TX PC5 UE 506 via RRC signaling or DCI. In some aspects, the TX PC5 UE 506 may transmit, to the base station 502, a transmission configuration (e.g., in an RRC parameter(s), such as txconfig) and/or at least one RS on at least one resource (e.g., at least one SRS). The base station 502 may receive the transmission configuration and/or at least one RS, and the base station 502 may determine a transmission scheme and/or precoder for the TX PC5 UE 506 that mitigates interference on the interference channel 516 to the reception of uplink communication by the base station 502 on the Uu link 512. The base station 502 may determine the transmission scheme and/or precoder for one or both of codebook-based and/or non-codebook-based transmission configurations. The base station 502 may then transmit the transmission scheme and/or precoder information (e.g., PMI) to the TX PC5 UE 506 so that the TX PC5 UE 506 can transmit on the PC5 link 514 with reduced interference on the interference channel 516.

Figure 6:
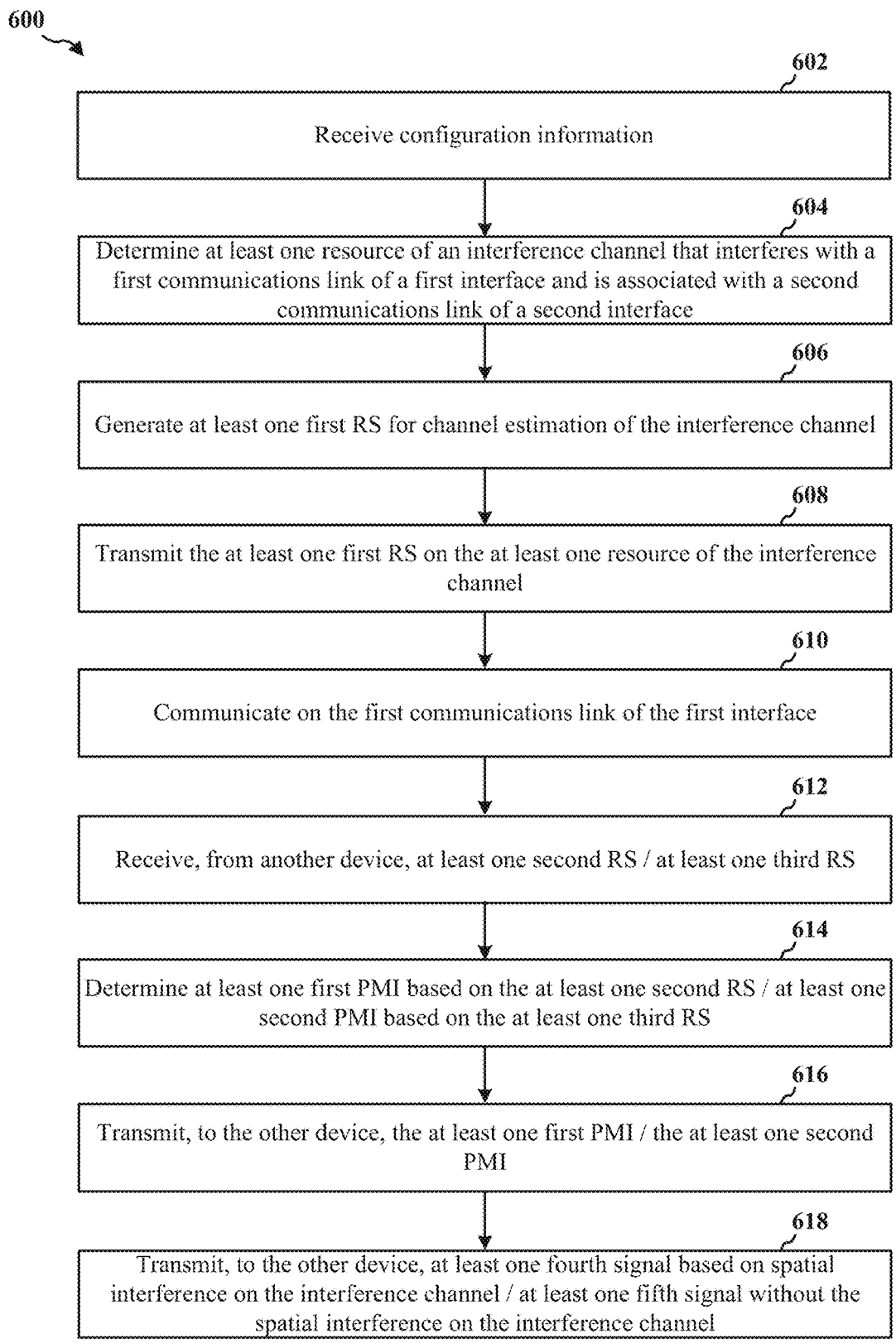
FIG. 6 is a flowchart of a method of wireless communication by a wireless communications apparatus.

FIG. 6 is a flowchart of a method 600 of wireless communication by a wireless communications device. The method 600 may be implemented at a UE (e.g., the UE 104, 106, 108, 350, 404, 406, 408, 504, 506, 508), at a base station (e.g., the base station 102/180, 310, 402, 502), and/or at another apparatus (e.g., the apparatus 902, 1002). According to different aspects, one or more of the illustrated operations may be transposed, omitted, and/or contemporaneously performed.

At 602, the device may receive configuration information. For example, the configuration information may be received from a base station or another UE. The configuration information may be received via at least one of DCI, RRC signaling, and/or SCI. The configuration information may indicate a spatial transmit filter with which to transmit RSs. In some aspects, the configuration information may indicate a configuration for at least one RS and/or at least one resource on which to transmit the at least one RS. In some other aspects, the configuration information may indicate a configuration for reporting at least one first PMI with spatial interference on an interference channel and/or at least one second PMI without spatial interference on an interference channel. In further aspects, the configuration information may indicate a configuration for transmitting at least one second RS with spatial interference on an interference channel for determining precoding matrix information and/or transmitting at least one third RS without spatial interference on an interference channel. Referring to FIG. 4, for example, at least one of the Uu UE 404 and/or the TX PC5 UE 406 may receive configuration information associated with transmitting or receiving signaling on the interference channel 416.

In some aspects, the configuration information may include a transmission configuration that includes at least one of a transmission scheme and/or a precoder. In some aspects, the transmission configuration may be applied to codebook-based transmissions, whereas in other aspects, the transmission configured may be applied to non-codebook-based transmissions. In still other aspects, the transmission configuration may be received on a different interface (e.g., Uu) than the one on which the transmission configuration is to be applied (e.g., PC5). For example, the transmission configuration may be received from a base station, and may configure the device to reduce interference caused to the base station. Referring to FIG. 5, for example, the PC5 UE 506 may receive a transmission configuration from the base station 502 for application on the PC5 link 514.

At 604, the device may determine at least one resource of an interference channel that interferes with a first communications link of a first interface and is associated with a second communications link of a second interface. In some aspects, the device may decode the received configuration information, and the device may identify an indication of the at least one resource of the interference channel from the decoded received configuration information. In some other aspects, the device may measure energy or may measure an SNR on resources allocated to a link on which the device is communicating with another device. The device may compare the measured energy and/or SNR to a respective threshold, and the device may determine whether the at least one resource is on the interference channel based on the comparison. Referring to FIG. 4, for example, at least one of the base station 402, Uu UE 404, and/or first PC5 UE 406 may determine at least one resource of the interference channel 416 that interferes with one of the PC5 link 414 or the Uu link 412. Referring to FIG. 5, for example, the PC5 UE 506 may determine at least one resource of the interference channel 516 that interferes with the PC5 link 514.

At 606, the device may generate at least one first RS for channel estimation of the interference channel. According to various aspects, the at least one first RS may include one of an SRS, CSI-RS, DM-RS, or PT-RS. In some aspects, the at least one first RS may include a sequence that is selected based on the at least one first RS being intended for channel estimation. For example, first, the device may select a sequence for the at least one first RS and may generate a digital signal, and then, the device may convert the digital signal to analog for transmission. Referring to FIG. 4, for example, at least one of the base station 402, Uu UE 404, and/or first PC5 UE 406 may generate at least one first RS for channel estimation of the interference channel 416. Referring to FIG. 5, for example, the PC5 UE 506 may generate at least one first RS for channel estimation of the interference channel 516.

At 608, the device may transmit the at least one first RS on the at least one resource of the interference channel. That is, the device may transmit the at least one first RS on the first communications link, which may share the at least one resource with the second communications link (or the at least one resource may be adjacent to the resources of the second communications link, and so may leak into the resources of the second communications link). Referring to FIG. 4, for example, at least one of the base station 402, Uu UE 404, and/or first PC5 UE 406 may transmit the at least one first RS on the at least one resource on the interference channel 416. Referring to FIG. 5, for example, the PC5 UE 506 may transmit the at least one first RS on the at least one resource on the interference channel 516.

At 610, the device may communicate on the first communications link of the first interface. For example, the device may transmit signaling and/or the device may receive signaling on the first communications link of the first interface. When the device is a base station or is communicating on the uplink/downlink with a base station, the first interface may include a Uu interface. When the device is a UE communicating on the sidelink with another UE, the first interface may include a PC5 interface. Referring to FIG. 4, for example, the base station 402 and the Uu UE 404 may communicate on the Uu link 412 of the Uu interface, and/or the first PC5 UE 406 may communicate with the second PC5 UE 408 on the PC5 link 414 of the PC5 interface. Referring to FIG. 5, for example, the PC5 UE 506 may communicate with the second PC5 UE 508 on the PC5 link 514 of the PC5 interface.

At 612, the device may receive, from another device (e.g., a base station), at least one second RS and/or at least one third RS. In some aspects, the at least one second RS and/or at least one third RS may include one or more of an SSB, CSI-RS, DM-RS, and/or PT-RS. In some other aspects, the at least one second RS and/or at least one third RS may include at least one SRS. Referring to FIG. 4, for example, the Uu UE 404 or the PC5 UE 406 may receive, from the base station 402, at least one second RS and/or at least one third RS. In another example, the base station 402 may receive, from one of the Uu UE 404 or the PC5 UE 406, at least one second RS and/or at least one third RS.

At 614, the device may determine at least one first PMI based on the at least one second RS and/or at least one second PMI based on the at least one third RS. For example, first, the device may perform channel estimation of the first communications link (e.g., using the at least one second RS and/or at least one third RS), and second, the device may calculate or compute a desired precoder based on the channel estimation. In some aspects, the at least one first PMI may be determined with spatial interference on the interference channel (e.g., using the at least one second RS), and the at least one second PMI may be determined without the spatial interference on the interference channel (e.g., using the at least one third RS). Referring to FIG. 4, for example, the Uu UE 404 may determine at least one first PMI for the Uu link 412 based on the at least one second RS received from the base station 402 and/or at least one second PMI based on the at least one third RS received from the base station 402.

At 616, the device may transmit, to the other device (e.g., base station), the at least one first PMI and/or the at least one second PMI. Referring to FIG. 4, for example, the Uu UE 404 may transmit the at least one first PMI to the base station 402 on the Uu link 412 and/or may transmit the at least one second PMI to the base station 402 on the Uu link 412.

At 618, the device may transmit, to the other device (e.g., base station), at least one fourth signal based on spatial interference on the interference channel and/or at least one fifth signal without the spatial interference on the interference channel. For example, the at least one fourth signal and/or at least one fifth signal may include another RS. In some aspects, the at least one fourth signal and/or the at least one fifth signal may enable precoder calculations by the other device (e.g., the base station on a Uu link or the other PC5 UE on a PC5 link). In some other aspects, the at least one fourth signal and/or the at least one fifth signal may be based on channel estimates or precoded signals received from the other device. Referring to FIG. 4, for example, the Uu UE 404 or the PC5 UE 406 may transmit, to the base station 402, at least one fourth RS based on spatial interference on the interference channel 416 and/or at least one fifth RS with spatial interference on the interference channel 416 being canceled or nulled. In another example, the base station 402 may transmit, to one of the Uu UE 404 or the PC5 UE 406, at least one fourth RS based on spatial interference on the interference channel 416 and/or at least one fifth RS with spatial interference on the interference channel 416 being canceled or nulled.

Figure 7:
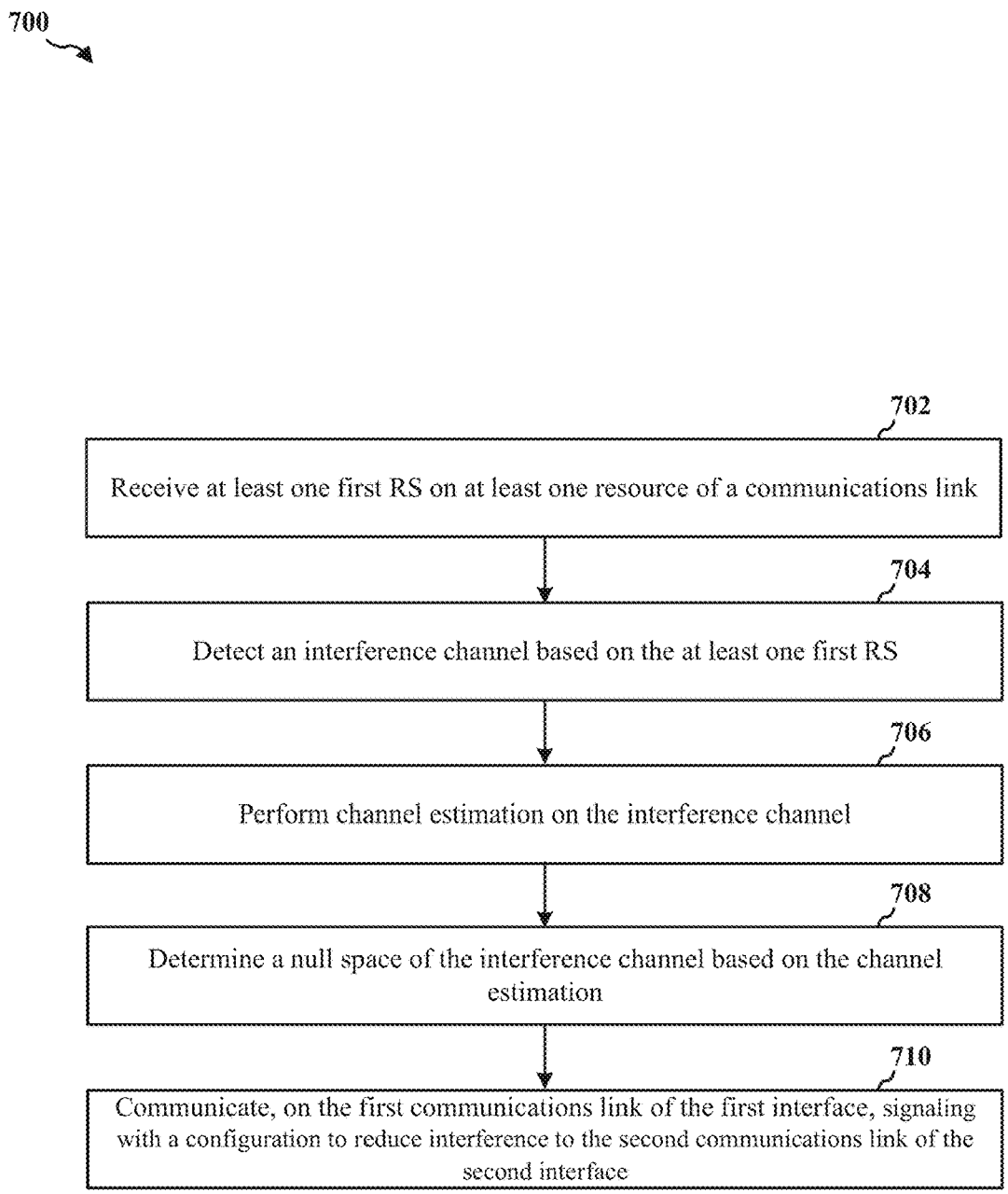
FIG. 7 is a flowchart of a method of wireless communication by a UE.

FIG. 7 is a flowchart of a method 700 of wireless communication by a wireless communications device. The method 700 may be implemented at a UE (e.g., the UE 104, 106, 108, 350, 404, 406, 408, 504, 506, 508), at a base station (e.g., the base station 102/180, 310, 402, 502), and/or at another apparatus (e.g., the apparatus 902, 1002). According to different aspects, one or more of the illustrated operations may be transposed, omitted, and/or contemporaneously performed.

At 702, the device may receive at least one first RS on at least one resource of a first communications link. In some aspects, the at least one first RS may be a CSI-RS, PT-RS, or DM-RS. In some other aspects, the at least one first RS may be an SRS. Potentially, the at least one first RS may include a known sequence. In some aspects, the at least one first RS may be received on a different interface than the interface on which the device is communicating. For example, the at least one first RS may indicate the presence of another communication link that shares at least some resources with the communication link on which the device is communicating—e.g., the at least one first RS may be received on an interference channel. Referring to FIG. 4, for example, the Uu UE 404 or the PC5 UE 406 may receive at least one first RS on at least one resource of the Uu link 412 or the PC5 link 414, respectively.

At 704, the device may detect an interference channel based on the at least one first RS. The interference channel may be on resources of the first communications link of the first interface that are shared with and/or adjacent to a second communications link of a second interface. For example, the device may detect a sequence included in the at least one first RS, and the device may compare the detected sequence to at least one known sequence in order to determine whether the two match. In another example, the device may measure an SNR on resources of the first communications link, and the device may SNR the noise with a threshold. When the SNR is less than the threshold, the device may detect the interference channel. Referring to FIG. 4, for example, the Uu UE 404 or the PC5 UE 406 may detect an interference channel 416 based on the at least one RS.

At 706, the device may perform channel estimation on the interference channel based on receiving the at least one first RS. For example, the device may measure at least one value, such as an L1-SNR and/or an L1-reference signal received power (RSRP), another L1 value, and/or other value, and the device may calculate a matrix model of the interference channel based on the at least one value. Referring to FIG. 4, for example, the Uu UE 404 or the PC5 UE 406 may perform channel estimation on the interference channel 416 based on receiving the at least one first RS on the Uu link 412 or the PC5 link 414, respectively.

At 708, the device may determine a null space of the interference channel based on the channel estimation of the interference channel. For example, the device may find the null space of the matrix model of the interference channel derived from performing the channel estimation, and the device may identify a beamforming and/or precoding configuration that corresponds to the null space of the matrix. The beamforming and/or precoding configuration may be such that the interference to the second communications link on the interference channel is reduced or minimized. Referring to FIG. 4, for example, the Uu UE 404 or the PC5 UE 406 may determine a null space of the interference channel 416 based on the channel estimation of the interference channel 416.

At 710, the device may communicate, on the first communications link of the first interface, signaling with a configuration to reduce interference to the second communications link of the second interface. For example, the device may transmit a signal on the first communications link along a vector defined by the null space of the matrix modeling the interference channel. In some aspects, the device may transmit non-precoded signaling (e.g., non-precoded SRS) In some aspects, the device may transmit a first signal that is orthogonal on the interference channel to second signaling of the second communications link of the second interface. Referring to FIG. 4, for example, the Uu UE 404 or the PC5 UE 406 may communicate, on the Uu link 412 of the Uu interface or the PC5 link 414 of the PC5 interface, respectively, signaling configured to reduce interference to the PC5 link 414 of the PC5 interface or the Uu link 412 of the Uu interface, respectively, on the interference channel 416.

Figure 8:
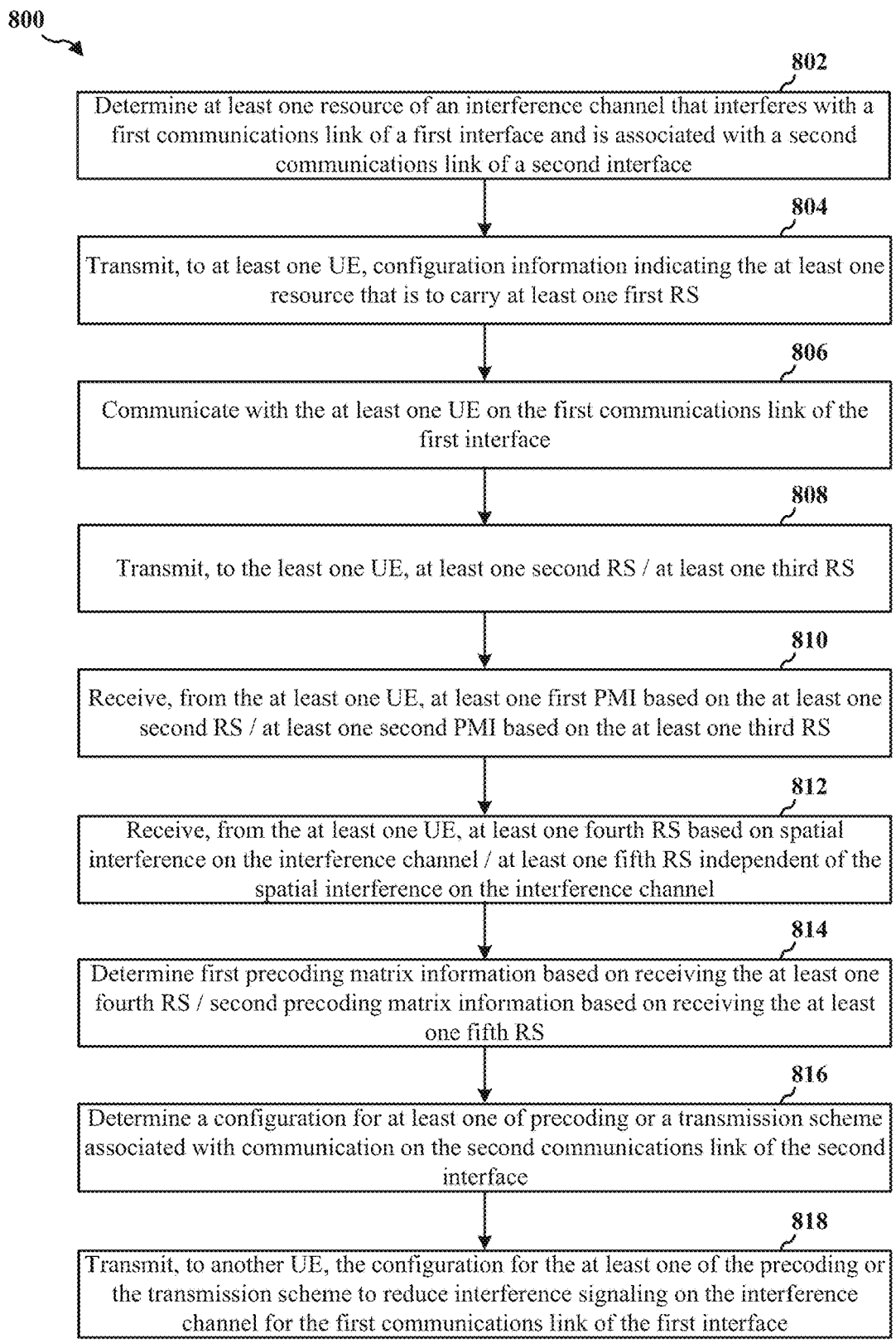
FIG. 8 is a flowchart of a method of wireless communication by a base station.

FIG. 8 is a flowchart of a method 800 of wireless communication by a wireless communications device. The method 800 may be performed by a base station (e.g., the base station 102/180, 310, 402, 502) and/or another apparatus (e.g., the apparatus 1002). According to different aspects, one or more of the illustrated operations may be transposed, omitted, and/or contemporaneously performed.

At 802, the base station may determine at least one resource of an interference channel that interferes with a first communications link of a first interface and is associated with a second communications link of a second interface. For example, the base station may detect signaling on a PC5 interface while the base station is transmitting and/or receiving on a Uu interface. The signal on the PC5 interface may be sidelink (or direct device) signaling, and therefore, may not be intended for the base station. The base station may measure the amount of interference, such as by measuring an SNR and/or RSRP, and the base station may compare the measurement to a threshold. When the measurement satisfies (e.g., is greater than or equal to) a threshold point at which interfering signaling becomes unlikely to disrupt communication on the Uu interface, then the interference from the second communication link may be negligible and, potentially may not affect communication the first communication link. When the measurement fails to satisfy the threshold, however, signaling on the interference channel may overlap with signaling to and/or from the base station. The base station may compare measurements from each of multiple resources on the Uu link 410 to find a set of resources having the highest energies (view at the base station as interference) relative to one another or most frequently played, and the base station may model the set of resources as an interference channel of the first and second communications links. Referring to FIG. 4, for example, the base station 402 may determine at least one resource of an interference channel 416 that interferes with the Uu link 412 of the Uu interface and the PC5 link 414 of the PC5 interface.

At 804, the base station may transmit, to at least one UE, configuration information for communication of a set of reference signals based on the interference channel. According to various aspects, the configuration information may be transmitted via one of DCI or RRC signaling. In some aspects, the configuration information may indicate a configuration for at least one RS and/or at least one resource on which to transmit the at least one RS. In some other aspects, the configuration information may indicate a configuration for communicating (e.g., transmitting or receiving) at least one first PMI with spatial interference on an interference channel and/or at least one second PMI without spatial interference on an interference channel. In further aspects, the configuration information may indicate a configuration for communicating (e.g., transmitting or receiving) at least one second RS with spatial interference on an interference channel for determining precoding matrix information and/ or communicating at least one third RS without spatial interference on an interference channel. Referring to FIG. 4, for example, the base station 402 may transmit, to at least one of the Uu UE 404 or the PC5 UE 406, configuration information for communication of a set of RSs based on the interference channel 416.

At 806, the base station may communicate with the at least one UE on the first communications link of the first interface. That is, the base station may transmit data and/or control information to a UE on the Uu link of the Uu interface. Referring to FIG. 4, for example, the base station 402 may communicate data or control information with the Uu UE 404 on the Uu link 412.

At 808, the base station may transmit, to the at least one UE, at least one second RS and/or at least one third RS. According to various aspects, the at least one second RS and/or the at least one third RS may include at least one of an SSB, CSI-RS, and/or DM-RS, PT-RS. Referring to FIG. 4, for example, the base station 402 may transmit at least one second RS and/or at least one third RS to the Uu UE 404 on the Uu link 412.

At 810, the base station may receive, from the at least one UE, at least one first PMI based on the at least one second RS and/or at least one second PMI based on the at least one third RS. The at least one first PMI may be associated with downlink communication on the first communications link of the first interface with spatial interference on the interference channel. The at least one second PMI may be associated with downlink communication on the first communications link of the first interface without spatial interference on the interference channel. Referring to FIG. 4, for example, the base station 402 may receive a first PMI and/or a second PMI from the Uu UE 404 on the Uu link 412 based on that couch n play Duke. Referring to FIG. 4, for example, the base station 402 may transmit at least one second RS and/or at least one third RS to the Uu UE 404 on the Uu link 412.

At 812, the base station may receive, from the at least one UE, at least one fourth RS based on spatial interference on the interference channel and/or at least one fifth RS without the spatial interference on the interference channel. According to various aspects, the at least one fourth RS and/or the at least one fifth RS may include at least one of an SRS, CSI-RS, and/or DM-RS, PT-RS. Referring to FIG. 4, for example, the base station 402 may receive at least one fourth RS and/or at least one fifth RS from the Uu UE 404 on the Uu link 412.

At 814, the base station may determine first precoding matrix information based on receiving the at least one fourth RS and/or second precoding matrix information based on receiving the at least one fifth RS. For example, the base station may measure one or more values indicative of channel quality (e.g., SNR, RSRP, etc.) based on receiving the fourth RS with spatial interference on the interference channel, the base station may further model the channel between the base station and the UE, and the base station may select a precoding matrix based on the channel between the base station and the UE with spatial interference on the interference channel. In another example, the base station may measure one or more other values indicative of channel quality (e.g., another SNR, another RSRP, etc.) based on receiving the at least one fifth RS without spatial interference on the interference channel, the base station may model the another channel between the base station and the UE, and the base station may select another precoding matrix based on the other channel between the base station and the UE without spatial interference on the interference channel. Referring to FIG. 4, for example, the base station 402 may receive at least one fourth RS and/or at least one fifth RS from the Uu UE 404 on the Uu link 412.

At 816, the base station may determine a configuration for at least one of precoding or a transmission scheme associated with communication on the second communications link of the second interface. For example, the base station may identify the shared resources on the interference channel of the first communications link, and the base station may reconfigure a precoder and/or a transmission scheme (e.g., transmission power, transmission mode, etc.) for a UE based on the interference on the shared resources of the interference channel. Referring to FIG. 4, for example, the base station 402 may determine a configuration for at least one of precoding or a transmission scheme associated with communication on the PC5 link 414 of the PC5 interface.

At 818, the base station may transmit, to another UE, the configuration for the at least one of the precoding or the transmission scheme to reduce interference signaling on the interference channel for the first communications link of the first interface. Referring to FIG. 4, for example, the base station 402 may transmit, to the first PC5 UE 406, a configuration for the at least one of the precoding or the transmission scheme to reduce interference signaling on the interference channel 416 for the Uu link 414 of the Uu interface.

Figure 9:
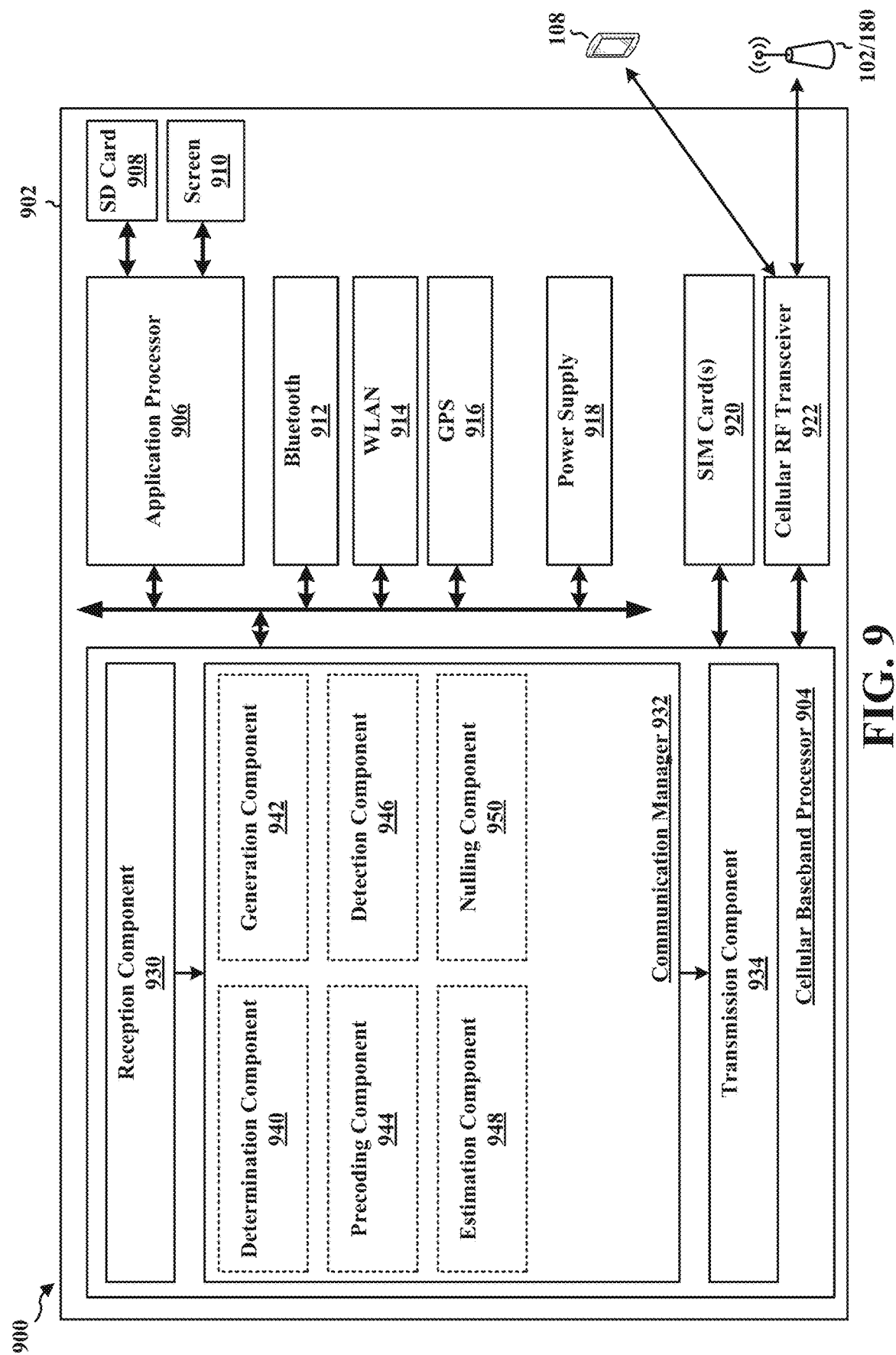
FIG. 9 is a diagram illustrating an example of a hardware implementation for an example apparatus.

FIG. 9 is a diagram 900 illustrating an example of a hardware implementation for an apparatus 902. The apparatus 902 may be a UE or similar device, or the apparatus 902 may be a component of a UE or similar device. The apparatus 902 may include a cellular baseband processor 904 (also referred to as a modem) and/or a cellular RF transceiver 922, which may be coupled together and/or integrated into the same package or module.

In some aspects, the apparatus 902 may accept or may include one or more subscriber identity modules (SIM) cards 920, which may include one or more integrated circuits, chips, or similar circuitry, and which may be removable or embedded. The one or more SIM cards 920 may carry identification and/or authentication information, such as an international mobile subscriber identity (IMSI) and/or IMSI-related key(s). Further, the apparatus 902 may include one or more of an application processor 906 coupled to a secure digital (SD) card 908 and a screen 910, a Bluetooth module 912, a wireless local area network (WLAN) module 914, a Global Positioning System (GPS) module 916, and/or a power supply 918.

The cellular baseband processor 904 communicates through the cellular RF transceiver 922 with the UE 108 or base station 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904.

In the context of FIG. 3, the cellular baseband processor 904 may be a component of the UE 350 and may include the memory 360 and/or at least one of the TX processor 368, the RX processor 356, and/or the controller/processor 359. In one configuration, the apparatus 902 may be a modem chip and/or may be implemented as the baseband processor 904, while in another configuration, the apparatus 902 may be the entire UE (e.g., the UE 350 of FIG. 3) and may include some or all of the abovementioned modules, components, and/or circuitry illustrated in the context of the apparatus 902. In one configuration, the cellular RF transceiver 922 may be implemented as at least one of the transmitter 354TX and/or the receiver 354RX.

The reception component 930 may be configured to receive signaling on a wireless channel, such as signaling from a base station 102/180 or UE 108. The transmission component 934 may be configured to transmit signaling on a wireless channel, such as signaling to a base station 102/180 or UE 108. The communication manager 932 may coordinate or manage some or all wireless communications by the apparatus 902, including across the reception component 930 and the transmission component 934.

The reception component 930 may provide some or all data and/or control information included in received signaling to the communication manager 932, and the communication manager 932 may generate and provide some or all of the data and/or control information to be included in transmitted signaling to the transmission component 934. The communication manager 932 may include the various illustrated components, including one or more components configured to process received data and/or control information, and/or one or more components configured to generate data and/or control information for transmission.

The communication manager 932 may include one or more of a determination component 940, a generation component 942, a precoding component 944, a detection component 946, an estimation component 948, and a nulling component 950.

In one configuration of the apparatus 902, the reception component 930 may be configured to receive configuration information, e.g., as described in connection with 602 of FIG. 6. For example, the configuration information may be received from a base station 102/180 or another UE (e.g., UE 104 or UE 108). The configuration information may be received via at least one of DCI, RRC signaling, and/or SCI. The configuration information may indicate a spatial transmit filter with which to transmit RSs. In some aspects, the configuration information may indicate a configuration for at least one RS and/or at least one resource on which to transmit the at least one RS. In some other aspects, the configuration information may indicate a configuration for reporting at least one first PMI with spatial interference on an interference channel and/or at least one second PMI without spatial interference on an interference channel. In further aspects, the configuration information may indicate a configuration for transmitting at least one second RS with spatial interference on an interference channel for determining precoding matrix information and/or transmitting at least one third RS without spatial interference on an interference channel.

In some aspects, the configuration information may include a transmission configuration that includes at least one of a transmission scheme and/or a precoder. In some aspects, the transmission configuration may be applied to codebook-based transmissions, whereas in other aspects, the transmission configured may be applied to non-codebook-based transmissions. In still other aspects, the transmission configuration may be received on a different interface (e.g., Uu) than the one on which the transmission configuration is to be applied (e.g., PC5). For example, the transmission configuration may be received from a base station 102/180, and may configure the device to reduce interference caused to the base station 102/180.

The determination component 940 may be configured to determine at least one resource of an interference channel that interferes with a first communications link of a first interface and is associated with a second communications link of a second interface, e.g., as described in connection with 604 of FIG. 6. In some aspects, the determination component 940 may decode the received configuration information, and the determination component 940 may identify an indication of the at least one resource of the interference channel from the decoded received configuration information. In some other aspects, the determination component 940 may measure energy or may measure an SNR on resources allocated to a link on which the apparatus 902 is communicating with another device. The determination component 940 may compare the measured energy and/or SNR to a respective threshold, and the determination component 940 may determine whether the at least one resource is on the interference channel based on the comparison.

The generation component 942 may generate at least one first RS for channel estimation of the interference channel, e.g., as described in connection with 606 of FIG. 6. According to various aspects, the at least one first RS may include one of an SRS, CSI-RS, DM-RS, or PT-RS. In some aspects, the at least one first RS may include a sequence that is selected based on the at least one first RS being intended for channel estimation. For example, first, the generation component 942 may select a sequence for the at least one first RS and may generate a digital signal, and then, the generation component 942 may convert the digital signal to analog for transmission.

The transmission component 934 may transmit the at least one first RS on the at least one resource of the interference channel, e.g., as described in connection with 608 of FIG. 6. That is, the transmission component 934 may transmit the at least one first RS on the first communications link, which may share the at least one resource with the second communications link (or the at least one resource may be adjacent to the resources of the second communications link, and so may leak into the resources of the second communications link).

The reception component 930 and/or the transmission component 934 may communicate on the first communications link of the first interface, e.g., as described in connection with 610 of FIG. 6. For example, the transmission component 934 may transmit signaling and/or the reception component 930 may receive signaling on the first communications link of the first interface. When the apparatus 902 is implemented at a base station or is communicating on the uplink/downlink with a base station 102/180, the first interface may include a Uu interface. When the apparatus is implemented at a UE communicating on the sidelink with another UE, the first interface may include a PC5 interface.

The reception component 930 may receive, from another device (e.g., a base station 102/180), at least one second RS and/or at least one third RS, e.g., as described in connection with 612 of FIG. 6. In some aspects, the at least one second RS and/or at least one third RS may include one or more of an SSB, CSI-RS, DM-RS, and/or PT-RS. In some other aspects, the at least one second RS and/or at least one third RS may include at least one SRS.

The precoding component 944 may determine at least one first PMI based on the at least one second RS and/or at least one second PMI based on the at least one third RS, e.g., as described in connection with 614 of FIG. 6. For example, first, the precoding component 944 may perform channel estimation of the first communications link (e.g., using the at least one second RS and/or at least one third RS), and second, the precoding component 944 may calculate or compute a desired precoder based on the channel estimation. In some aspects, the at least one first PMI may be determined with spatial interference on the interference channel (e.g., using the at least one second RS), and the at least one second PMI may be determined without the spatial interference on the interference channel (e.g., using the at least one third RS).

The transmission component 934 may transmit, to the other device (e.g., base station 102/180), the at least one first PMI and/or the at least one second PMI, e.g., as described in connection with 616 of FIG. 6.

The transmission component 934 may transmit, to the other device (e.g., base station 102/180), at least one fourth signal based on spatial interference on the interference channel and/or at least one fifth signal without the spatial interference on the interference channel, e.g., as described in connection with 618 of FIG. 6. For example, the at least one fourth signal and/or at least one fifth signal may include another RS. In some aspects, the at least one fourth signal and/or the at least one fifth signal may enable precoder calculations by the other device (e.g., the base station 102/180 on a Uu link or the other PC5 UE on a PC5 link). In some other aspects, the at least one fourth signal and/or the at least one fifth signal may be based on channel estimates or precoded signals received from the other device.

In another configuration of the apparatus 902, the reception component 930 may receive at least one first RS on at least one resource of a first communications link, e.g., as described in connection with 702 of FIG. 7. In some aspects, the at least one first RS may be a CSI-RS, PT-RS, or DM-RS. In some other aspects, the at least one first RS may be an SRS. Potentially, the at least one first RS may include a known sequence. In some aspects, the at least one first RS may be received on a different interface than the interface on which the device is communicating. For example, the at least one first RS may indicate the presence of another communication link that shares at least some resources with the communication link on which the device is communicating—e.g., the at least one first RS may be received on an interference channel.

The detection component 946 may detect an interference channel based on the at least one first RS, e.g., as described in connection with 704 of FIG. 7. The interference channel may be on resources of the first communications link of the first interface that are shared with and/or adjacent to a second communications link of a second interface. For example, the detection component 946 may detect a sequence included in the at least one first RS, and the detection component 946 may compare the detected sequence to at least one known sequence in order to determine whether the two match. In another example, the detection component 946 may measure an SNR on resources of the first communications link, and the detection component 946 may SNR the noise with a threshold. When the SNR is less than the threshold, the detection component 946 may detect the interference channel.

The estimation component 948 may perform channel estimation on the interference channel based on receiving the at least one first RS, e.g., as described in connection with 706 of FIG. 7. For example, the estimation component 948 may measure at least one value, such as an L1-SNR and/or an L1-RSRP, another L1 value, and/or other value, and the estimation component 948 may calculate a matrix model of the interference channel based on the at least one value.

The nulling component 950 may determine a null space of the interference channel based on the channel estimation of the interference channel, e.g., as described in connection with 708 of FIG. 7. For example, the nulling component 950 may find the null space of the matrix model of the interference channel derived from performing the channel estimation, and the nulling component 950 may identify a beamforming and/or precoding configuration that corresponds to the null space of the matrix. The beamforming and/or precoding configuration may be such that the interference to the second communications link on the interference channel is reduced or minimized.

The reception component 930 and/or the transmission component 934 may communicate, on the first communications link of the first interface, signaling with a configuration to reduce interference to the second communications link of the second interface, e.g., as described in connection with 710 of FIG. 7. For example, the transmission component 934 may transmit a signal on the first communications link along a vector defined by the null space of the matrix modeling the interference channel. In some aspects, the transmission component 934 may transmit non-precoded signaling (e.g., non-precoded SRS) In some aspects, the transmission component 934 may transmit a first signal that is orthogonal on the interference channel to second signaling of the second communications link of the second interface.

The apparatus 902 may include additional components that perform some or all of the blocks, operations, signaling, etc. of the algorithms in the aforementioned flowchart of FIGS. 6 and 7. As such, some or all of the blocks, operations, signaling, etc. in the aforementioned flowcharts of FIGS. 6 and 7 may be performed by a component and the apparatus 902 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for transmitting a set of reference signals on shared resources of a first communication link and a second communication link, the set of reference signals indicating an interference channel on the shared resources; and means for communicating data or control information on the first communication link following transmission of the set of reference signals.

In one configuration, one of the first communication link or the second communication link is configured on a Uu interface, and another of the first communication link or the second communication link is configured on a PC5 interface.

In one configuration, the apparatus 902, and in particular the cellular baseband processor 904, may further include means for receiving information configuring transmission of the set of reference signals via DCI, RRC signaling, or SCI.

In one configuration, the information configuring the transmission of the set of reference signals includes information indicating a spatial transmit filter with which to transmit the set of reference signals.

In one configuration, the set of reference signals includes at least one of a SRS, a DM-RS, a PT-RS, or a CSI-RS.

In one configuration, the apparatus 902, and in particular the cellular baseband processor 904, may further include means for receiving a precoding matrix indicator (PMI), and the PMI is based on spatial interference being on the interference channel; and means for transmitting the data or control information on the first communication link based on the PMI when the spatial interference is on the interference channel.

In one configuration, the apparatus 902, and in particular the cellular baseband processor 904, may further include means for receiving another PMI, and the other PMI is based on the spatial interference being absent from the interference channel; and means for transmitting the data or control information on the first communication link based on the other PMI when the spatial interference is absent from the interference channel.

In one configuration, the apparatus 902, and in particular the cellular baseband processor 904, may further include means for transmitting a second set of reference signals on the first communication link with the spatial interference on the interference channel; and means for transmitting a third set of reference signals on the first communication link without the spatial interference on the interference channel, and the PMI is based on the second set of reference signals and the other PMI is based on the third set of reference signals.

In one configuration, the apparatus 902, and in particular the cellular baseband processor 904, may further include means for calculating a PMI based on receiving a second set of reference signals on the first communication link with spatial interference being on the interference channel; means for transmitting information indicating the PMI on the first communication link; and means for receiving the data or control information on the first communication link based on the PMI when the spatial interference is on the interference channel.

In one configuration, the apparatus 902, and in particular the cellular baseband processor 904, may further include means for calculating another PMI based on receiving a third set of reference signals on the first communication link without spatial interference being on the interference channel; means for transmitting information indicating the other PMI on the first communication link; and means for receiving the data or control information on the first communication link based on the other PMI when the spatial interference is absent from the interference channel.

In one configuration, a channel on which the set of reference signals is transmitted is at least one of non-precoded or non-whitened.

In one configuration, a channel on which the set of reference signals is transmitted is at least one of precoded or whitened.

In one configuration, the wireless communication apparatus includes of one a UE or a base station.

In another configuration, the apparatus 902, and in particular the cellular baseband processor 904, includes means for detecting signaling on shared resources of a first communication link and a second communication link, the signal being indicating an interference channel on the shared resources; means for performing channel estimation on the interference channel based on detecting the signal; means for communicating data or control information on the first communication link based on the channel estimation on the interference channel.

In the other configuration, one of the first communication link or the second communication link is configured on a Uu interface, and another of the first communication link or the second communication link is configured on a PC5 interface.

In the other configuration, the apparatus 902, and in particular the cellular baseband processor 904, may further include means for locating a null space associated with the interference channel based on the channel estimation on the interference channel; and means for transmitting a set of signals on the first communication link based on the locating of the null space, wherein the set of signals is transmitted on a precoded channel corresponding to the null space.

In the other configuration, the precoded channel is in the null space of the interference channel when the signal on the shared resources is non-precoded.

In the other configuration, the precoded channel is in the null space of a whitened interference channel.

In the other configuration, the precoded channel is in the null space of an effective precoded channel associated with the second communication link, and the set of signals on the precoded channel corresponding to the null space is orthogonal to another set of signals on the other precoded channel associated with the second communication link.

In the other configuration, the signal on the shared resources comprises at least one of a SRS, a DM-RS, a PT-RS, or a CSI-RS.

In the other configuration, the apparatus 902, and in particular the cellular baseband processor 904, may further include means for communicating a PMI based on a set of reference signals on the first communication link with spatial interference being on the interference channel; and means for communicating the data or control information on the first communication link based on the PMI when the spatial interference is on the interference channel.

In the other configuration, the apparatus 902, and in particular the cellular baseband processor 904, may further include means for communicating another PMI based on another set of reference signals on the first communication link without spatial interference being on the interference channel; and means for communicating the data or control information on the first communication link based on the other PMI when the spatial interference is absent from the interference channel.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
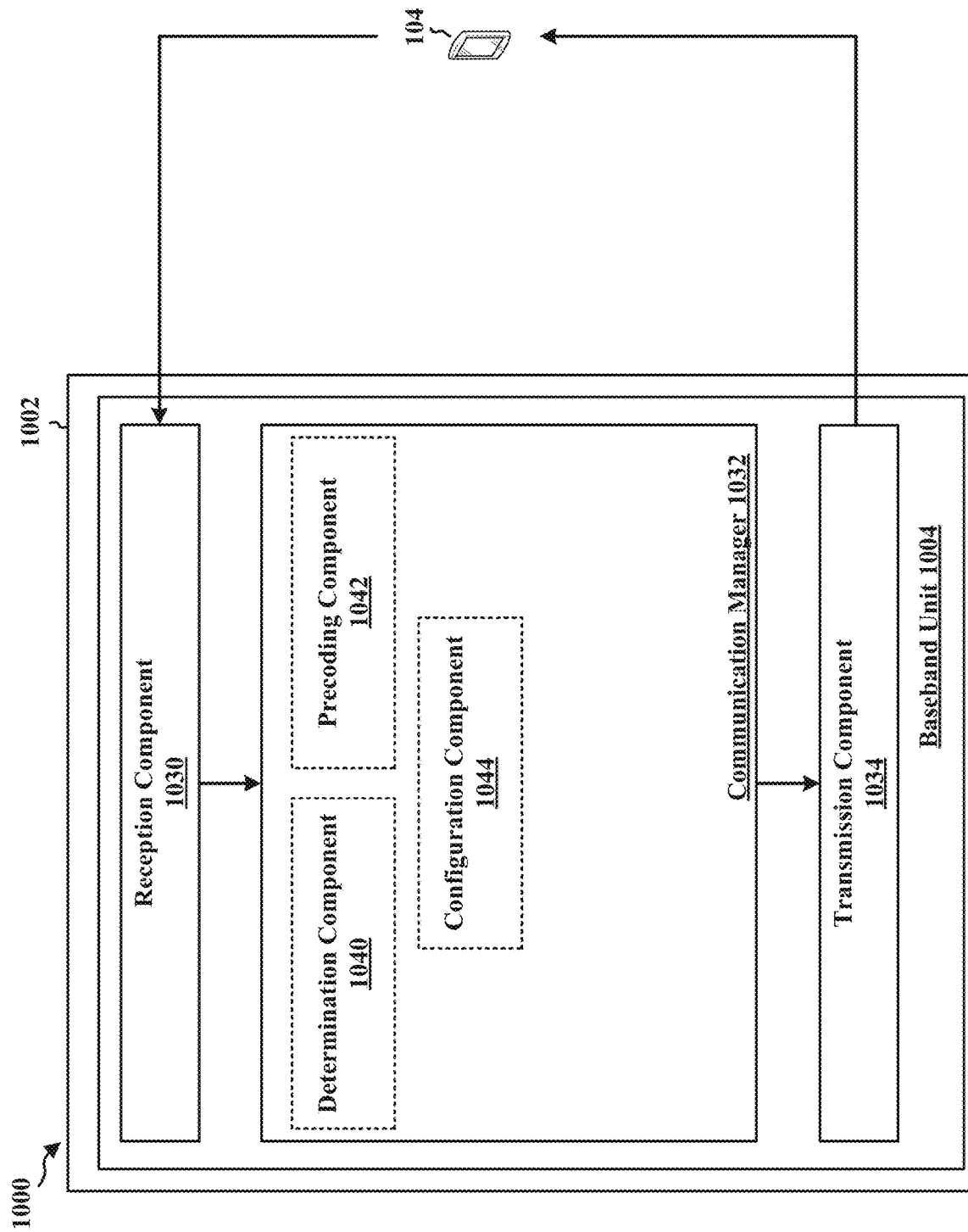
FIG. 10 is a diagram illustrating another example of a hardware implementation for another example apparatus.

FIG. 10 is a diagram 1000 illustrating an example of a hardware implementation for an apparatus 1002. The apparatus 1002 may be a base station or similar device or system, or the apparatus 1002 may be a component of a base station or similar device or system. The apparatus 1002 may include a baseband unit 1004. The baseband unit 1004 may communicate through a cellular RF transceiver. For example, the baseband unit 1004 may communicate through a cellular RF transceiver with a UE 104, such as for downlink and/or uplink communication, and/or with a base station 102/180, such as for IAB.

The baseband unit 1004 may include a computer-readable medium/memory, which may be non-transitory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The reception component 1030 may be configured to receive signaling on a wireless channel, such as signaling from a Uu UE 104, PC5 UE 106, or base station 102/180. The transmission component 1034 may be configured to transmit signaling on a wireless channel, such as signaling to a Uu UE 104, PC5 UE 106, or base station 102/180. The communication manager 1032 may coordinate or manage some or all wireless communications by the apparatus 1002, including across the reception component 1030 and the transmission component 1034.

The reception component 1030 may provide some or all data and/or control information included in received signaling to the communication manager 1032, and the communication manager 1032 may generate and provide some or all of the data and/or control information to be included in transmitted signaling to the transmission component 1034. The communication manager 1032 may include the various illustrated components, including one or more components configured to process received data and/or control information, and/or one or more components configured to generate data and/or control information for transmission. In some aspects, the generation of data and/or control information may include packetizing or otherwise reformatting data and/or control information received from a core network, such as the core network 190 or the EPC 160, for transmission.

The communication manager 1032 may include one or more of a determination component 1040, precoding component 1042, and/or configuration component 1044.

The determination component 1040 may determine at least one resource of an interference channel that interferes with a first communications link of a first interface and is associated with a second communications link of a second interface, e.g., as described in connection with 802 of FIG. 8. For example, the determination component 1040 may detect signaling on a PC5 interface while the transmission component 1034 is transmitting and/or receiving on a Uu interface. The signal on the PC5 interface may be sidelink (or direct device) signaling, and therefore, may not be intended for the apparatus 1002. The determination component 1040 may measure the amount of interference, such as by measuring an SNR and/or RSRP, and the determination component 1040 may compare the measurement to a threshold. When the measurement satisfies (e.g., is greater than or equal to) a threshold point at which interfering signaling becomes unlikely to disrupt communication on the Uu interface, then the interference from the second communication link may be negligible and, potentially may not affect communication the first communication link. When the measurement fails to satisfy the threshold, however, signaling on the interference channel may overlap with signaling to and/or from the apparatus 1002. The determination component 1040 may compare measurements from each of multiple resources on the Uu link 410 to find a set of resources having the highest energies (view at the base station as interference) relative to one another or most frequently played, and the determination component 1040 may model the set of resources as an interference channel of the first and second communications links.

The transmission component 1034 may transmit, to at least one of the UEs 104, 106, configuration information for communication of a set of reference signals based on the interference channel, e.g., as described in connection with 804 of FIG. 8. According to various aspects, the configuration information may be transmitted via one of DCI or RRC signaling. In some aspects, the configuration information may indicate a configuration for at least one RS and/or at least one resource on which to transmit the at least one RS. In some other aspects, the configuration information may indicate a configuration for communicating (e.g., transmitting or receiving) at least one first PMI with spatial interference on an interference channel and/or at least one second PMI without spatial interference on an interference channel. In further aspects, the configuration information may indicate a configuration for communicating (e.g., transmitting or receiving) at least one second RS with spatial interference on an interference channel for determining precoding matrix information and/or communicating at least one third RS without spatial interference on an interference channel.

The reception component 1030 and/or the transmission component 1034 may communicate with the at least one UE on the first communications link of the first interface, e.g., as described in connection with 806 of FIG. 8. For example, the transmission component 1034 may transmit data and/or control information to at least one of the UEs 104, 106 on the Uu link of the Uu interface.

The transmission component 1034 may transmit, to the at least one of the UEs 104, 106, at least one second RS and/or at least one third RS, e.g., as described in connection with 808 of FIG. 8. According to various aspects, the at least one second RS and/or the at least one third RS may include at least one of an SSB, CSI-RS, and/or DM-RS, PT-RS.

The reception component 1030 may receive, from the at least one of the UEs 104, 106, at least one first PMI based on the at least one second RS and/or at least one second PMI based on the at least one third RS, e.g., as described in connection with 810 of FIG. 8. The at least one first PMI may be associated with downlink communication on the first communications link of the first interface with spatial interference on the interference channel. The at least one second PMI may be associated with downlink communication on the first communications link of the first interface without spatial interference on the interference channel.

The reception component 1030 may receive, from the at least one of the UEs 104, 106, at least one fourth RS based on spatial interference on the interference channel and/or at least one fifth RS without the spatial interference on the interference channel, e.g., as described in connection with 812 of FIG. 8. According to various aspects, the at least one fourth RS and/or the at least one fifth RS may include at least one of an SRS, CSI-RS, and/or DM-RS, PT-RS.

The precoding component 1042 may determine first precoding matrix information based on receiving the at least one fourth RS and/or second precoding matrix information based on receiving the at least one fifth RS, e.g., as described in connection with 814 of FIG. 8. For example, the precoding component 1042 may measure one or more values indicative of channel quality (e.g., SNR, RSRP, etc.) based on receiving the fourth RS with spatial interference on the interference channel, the precoding component 1042 may further model the channel between the apparatus 1002 and the at least one of the UEs 104, 106, and the precoding component 1042 may select a precoding matrix based on the channel between the apparatus 1002 and the at least one of the UEs 104, 106 with spatial interference on the interference channel. In another example, the precoding component 1042 may measure one or more other values indicative of channel quality (e.g., another SNR, another RSRP, etc.) based on receiving the at least one fifth RS without spatial interference on the interference channel, the precoding component 1042 may model the another channel between the apparatus 1002 and the at least one of the UEs 104, 106, and the precoding component 1042 may select another precoding matrix based on the other channel between the apparatus 1002 and the at least one of the UEs 104, 106 without spatial interference on the interference channel.

The configuration component 1044 may determine a configuration for at least one of precoding or a transmission scheme associated with communication on the second communications link of the second interface, e.g., as described in connection with 816 of FIG. 8. For example, the configuration component 1044 may identify the shared resources on the interference channel of the first communications link, and the configuration component 1044 may reconfigure a precoder and/or a transmission scheme (e.g., transmission power, transmission mode, etc.) for at least one of the UEs 104, 106 based on the interference on the shared resources of the interference channel.

The transmission component 1034 may transmit, to another one of the UE 104, 106, the configuration for the at least one of the precoding or the transmission scheme to reduce interference signaling on the interference channel for the first communications link of the first interface, e.g., as described in connection with 818 of FIG. 8.

The apparatus 1002 may include additional components that perform some or all of the blocks, operations, signaling, etc. of the algorithms in the aforementioned flowcharts of FIGS. 6 and 8. As such, some or all of the blocks, operations, signaling, etc. in the aforementioned flowcharts of FIGS. 6 and 8 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for configuring a UE for communication of a set of reference signals based on an interference channel, the interference channel comprising shared resources of a first communication link and a second communication link; and means for communicating data or control information on the first communication link following configuring the communication by the UE.

In one configuration, the apparatus 1002, and in particular the baseband unit 1004, includes means for detecting interference signaling on the interference channel; and means for configuring at least one of a transmission scheme or a precoder for the UE based on the interference signal, wherein the interference signal is transmitted by the UE.

In one configuration, the interference signal comprises at least one of a SRS, a DM-RS, a PT-RS, or a CSI-RS.

In one configuration, one of the first communication link or the second communication link is configured on a Uu interface, and another of the first communication link or the second communication link is configured on a PC5 interface.

In one configuration, the apparatus 1002, and in particular the baseband unit 1004, includes means for communicating a PMI based on a set of reference signals on the first communication link with spatial interference being on the interference channel; and means for communicating the data or control information on the first communication link based on the PMI when the spatial interference is on the interference channel.

In one configuration, the apparatus 1002, and in particular the baseband unit 1004, includes means for communicating another PMI based on another set of reference signals on the first communication link without spatial interference being on the interference channel; and means for communicating the data or control information on the first communication link based on the other PMI when the spatial interference is absent from the interference channel.

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a wireless communication apparatus, including: transmitting a set of reference signals on shared resources of a first communication link and a second communication link, the set of reference signals indicating an interference channel on the shared resources; and communicating data or control information on the first communication link following transmission of the set of reference signals.

Example 2 may be the method of example 1, wherein one of the first communication link or the second communication link is configured on a Uu interface, and another of the first communication link or the second communication link is configured on a PC5 interface.

Example 3 may be the method of example 1, further including: receiving information configuring transmission of the set of reference signals via DCI, RRC signaling, or SCI.

Example 4 may be the method of example 3, wherein the information configuring the transmission of the set of reference signals includes information indicating a spatial transmit filter with which to transmit the set of reference signals.

Example 5 may be the method of example 1, wherein the set of reference signals includes at least one of a SRS, a DM-RS, a PT-RS, or a CSI-RS.

Example 6 may be the method of example 1, further including: receiving a PMI, wherein the PMI is based on spatial interference being on the interference channel; and transmitting the data or control information on the first communication link based on the PMI when the spatial interference is on the interference channel.

Example 7 may be the method of example 6, further including: receiving another PMI, wherein the other PMI is based on the spatial interference being absent from the interference channel; and transmitting the data or control information on the first communication link based on the other PMI when the spatial interference is absent from the interference channel.

Example 8 may be the method of example 7, further including: transmitting a second set of reference signals on the first communication link with the spatial interference on the interference channel; and transmitting a third set of reference signals on the first communication link without the spatial interference on the interference channel, wherein the PMI is based on the second set of reference signals and the other PMI is based on the third set of reference signals.

Example 9 may be the method of example 1, further including: calculating a PMI based on receiving a second set of reference signals on the first communication link with spatial interference being on the interference channel; transmitting information indicating the PMI on the first communication link; and receiving the data or control information on the first communication link based on the PMI when the spatial interference is on the interference channel.

Example 10 may be the method of example 9, further including: calculating another PMI based on receiving a third set of reference signals on the first communication link without spatial interference being on the interference channel; transmitting information indicating the other PMI on the first communication link; and receiving the data or control information on the first communication link based on the other PMI when the spatial interference is absent from the interference channel.

Example 11 may be the method example 1, wherein a channel on which the set of reference signals is transmitted is at least one of non-precoded or non-whitened.

Example 12 may be the method of example 1, wherein a channel on which the set of reference signals is transmitted is at least one of precoded or whitened.

Example 13 may be the method of example 1, wherein the wireless communication apparatus includes of one a UE or a base station.

Example 14 may be a method of wireless communication at a wireless communication apparatus, including: detecting a signal on shared resources of a first communication link and a second communication link, the signal being indicating an interference channel on the shared resources; performing channel estimation on the interference channel based on detecting the signal; and communicating data or control information on the first communication link based on the channel estimation on the interference channel.

Example 15 may be the method of example 14, wherein one of the first communication link or the second communication link is configured on a Uu interface, and another of the first communication link or the second communication link is configured on a PC5 interface.

Example 16 may be the method of example 14, further including: locating a null space associated with the interference channel based on the channel estimation on the interference channel; and transmitting a set of signals on the first communication link based on the locating of the null space, wherein the set of signals is transmitted on a precoded channel corresponding to the null space.

Example 17 may be the method of example 16, wherein the precoded channel is in the null space of the interference channel when the signal on the shared resources is non-precoded.

Example 18 may be the method of example 16, wherein the precoded channel is in the null space of a whitened interference channel.

Example 19 may be the method of example 16, wherein the precoded channel is in the null space of an effective precoded channel associated with the second communication link, and the set of signals on the precoded channel corresponding to the null space is orthogonal to another set of signals on the other precoded channel associated with the second communication link.

Example 20 may be the method of example 14, wherein the signal on the shared resources includes at least one of a SRS, a DM-RS, a PT-RS, or a CSI-RS.

Example 21 may be the method of example 14, further including: communicating a PMI based on a set of reference signals on the first communication link with spatial interference being on the interference channel; and communicating the data or control information on the first communication link based on the PMI when the spatial interference is on the interference channel.

Example 22 may be the method of example 21, further including: communicating another PMI based on another set of reference signals on the first communication link without spatial interference being on the interference channel; and communicating the data or control information on the first communication link based on the other PMI when the spatial interference is absent from the interference channel.

Example 23 may be a method of wireless communication at a base station, including: configuring a UE for communication of a set of reference signals based on an interference channel, the interference channel including shared resources of a first communication link and a second communication link; and communicating data or control information on the first communication link following configuring the communication by the UE.

Example 24 may be the method of method of example 23, further including: detecting an interference signal on the interference channel; and configuring at least one of a transmission scheme or a precoder for the UE based on the interference signal, wherein the interference signal is transmitted by the UE.

Example 25 may be the method of example 23, wherein the interference signal includes at least one of a SRS, a DM-RS, a PT-RS, or a CSI-RS.

Example 26 may be the method of example 23, wherein one of the first communication link or the second communication link is configured on a Uu interface, and another of the first communication link or the second communication link is configured on a PC5 interface.

Example 27 may be the method of example 23, further including: communicating a PMI based on a set of reference signals on the first communication link with spatial interference being on the interference channel; and communicating the data or control information on the first communication link based on the PMI when the spatial interference is on the interference channel.

Example 28 may be the method of example 27, further including: communicating another PMI based on another set of reference signals on the first communication link without spatial interference being on the interference channel; and communicating the data or control information on the first communication link based on the other PMI when the spatial interference is absent from the interference channel.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a memory; and
   at least one processor coupled to the memory and configured to:
      transmit a set of reference signals on shared resources of a first communication link on one of a Uu interface or a PC5 interface and a second communication link on the other of the Uu interface or the PC5 interface, the set of reference signals indicating an interference channel between the Uu interface and the PC5 interface on the shared resources; and
      communicate data or control information on the first communication link following transmission of the set of reference signals.

2. The apparatus of claim 1, wherein the at least one processor is further configured to:
   receive information configuring transmission of the set of reference signals via downlink control information (DCI), radio resource control (RRC) signaling, or sidelink control information (SCI).

3. The apparatus of claim 2, wherein the information configuring the transmission of the set of reference signals comprises information indicating a spatial transmit filter with which to transmit the set of reference signals.

4. The apparatus of claim 1, wherein the set of reference signals comprises at least one of a sounding reference signal (SRS), a demodulation reference signal (DM-RS), a phase tracking reference signal (PT-RS), or a channel state information reference signal (CSI-RS).

5. The apparatus of claim 1, wherein the at least one processor is further configured to:
receive a precoding matrix indicator (PMI), wherein the PMI is based on spatial interference being on the interference channel; and
transmit the data or control information on the first communication link based on the PMI when the spatial interference is on the interference channel.

6. The apparatus of claim 5, wherein the at least one processor is further configured to:
receive another precoding matrix indicator (PMI), wherein the other PMI is based on the spatial interference being absent from the interference channel; and
transmit the data or control information on the first communication link based on the other PMI when the spatial interference is absent from the interference channel.

7. The apparatus of claim 6, wherein the at least one processor is further configured to:
transmit a second set of reference signals on the first communication link with the spatial interference on the interference channel; and
transmit a third set of reference signals on the first communication link without the spatial interference on the interference channel, wherein
the PMI is based on the second set of reference signals and the other PMI is based on the third set of reference signals.

8. The apparatus of claim 1, wherein the at least one processor is further configured to:
calculate a precoding matrix indicator (PMI) based on receiving a second set of reference signals on the first communication link with spatial interference being on the interference channel;
transmit information indicating the PMI on the first communication link; and
receive the data or control information on the first communication link based on the PMI when the spatial interference is on the interference channel.

9. The apparatus of claim 8, wherein the at least one processor is further configured to:
calculate another PMI based on receiving a third set of reference signals on the first communication link without spatial interference being on the interference channel;
transmit information indicating the other PMI on the first communication link; and
receive the data or control information on the first communication link based on the other PMI when the spatial interference is absent from the interference channel.

10. The apparatus of claim 1, wherein a channel on which the set of reference signals is transmitted is at least one of precoded or whitened.

11. The apparatus of claim 1, wherein the wireless communication apparatus comprises of a user equipment (UE) or a base station.

12. An apparatus for wireless communication, comprising:
a memory; and
at least one processor coupled to the memory and configured to:
detect a signal on shared resources of a first communication link on one of a Uu interface or a PC5 interface and a second communication link on the other of the Uu interface or the PC5 interface, the signal indicating an interference channel between the Uu interface and the PC5 interface on the shared resources;
perform channel estimation on the interference channel based on detection of the signal; and
communicate data or control information on the first communication link based on the channel estimation on the interference channel.

13. The apparatus of claim 12, wherein the at least one processor is further configured to:
locate a null space associated with the interference channel based on the channel estimation on the interference channel; and
transmit a set of signals on the first communication link based on the locating of the null space, wherein the set of signals is transmitted on a precoded channel corresponding to the null space.

14. The apparatus of claim 13, wherein the precoded channel is in the null space of the interference channel when the signal on the shared resources is non-precoded.

15. The apparatus of claim 13, wherein the precoded channel is in the null space of a whitened interference channel.

16. The apparatus of claim 13, wherein the precoded channel is in the null space of an effective precoded channel associated with the second communication link, and the set of signals on the precoded channel corresponding to the null space is orthogonal to another set of signals on another precoded channel associated with the second communication link.

17. The apparatus of claim 12, wherein the signal on the shared resources comprises at least one of a sounding reference signal (SRS), a demodulation reference signal (DM-RS), a phase tracking reference signal (PT-RS), or a channel state information reference signal (CSI-RS).

18. The apparatus of claim 12, wherein the at least one processor is further configured to:
communicate a precoding matrix indicator (PMI) based on a set of reference signals on the first communication link with spatial interference being on the interference channel; and
communicate the data or control information on the first communication link based on the PMI when the spatial interference is on the interference channel.

19. The apparatus of claim 18, wherein the at least one processor is further configured to:
communicate another precoding matrix indicator (PMI) based on another set of reference signals on the first communication link without spatial interference being on the interference channel; and
communicate the data or control information on the first communication link based on the other PMI when the spatial interference is absent from the interference channel.

20. An apparatus for wireless communication at a base station, comprising:
a memory; and
at least one processor coupled to the memory and configured to:
configure a user equipment (UE) for communication of a set of reference signals based on an interference channel, the interference channel comprising shared resources between a Uu interface and a PC5 interface, a first communication link being configured on one of the Uu interface or the PC5 interface and a second communication link being configured on the other of the Uu interface or the PC5 interface; and
communicate data or control information on the first communication link following configuring the communication by the UE.

21. The apparatus of claim 20, wherein the at least one processor is further configured to:
detect an interference signal on the interference channel; and
configure at least one of a transmission scheme or a precoder for the UE based on the interference signal, wherein the interference signal is transmitted by the UE.

22. The apparatus of claim 21, wherein the interference signal comprises at least one of a sounding reference signal (SRS), a demodulation reference signal (DM-RS), a phase tracking reference signal (PT-RS), or a channel state information reference signal (CSI-RS).

23. The apparatus of claim 20, wherein the at least one processor is further configured to:
communicate a precoding matrix indicator (PMI) based on a set of reference signals on the first communication link with spatial interference being on the interference channel; and
communicate the data or control information on the first communication link based on the PMI when the spatial interference is on the interference channel.

24. The apparatus of claim 23, wherein the at least one processor is further configured to:
communicate another precoding matrix indicator (PMI) based on another set of reference signals on the first communication link without spatial interference being on the interference channel; and
communicate the data or control information on the first communication link based on the other PMI when the spatial interference is absent from the interference channel.

25. A method of wireless communication at an apparatus, comprising:
transmitting a set of reference signals on shared resources between a Uu interface and a PC5 interface, a first communication link being configured on one of the Uu interface or the PC5 interface and a second communication link being configured on the other of the Uu interface or the PC5 interface, the set of reference signals being configured to indicate an interference channel on the shared resources; and
communicating data or control information on the first communication link following transmission of the set of reference signals.

26. The method of claim 25, further comprising:
receiving information configuring transmission of the set of reference signals via downlink control information (DCI), radio resource control (RRC) signaling, or sidelink control information (SCI).

* * * * *